(12) United States Patent
Lee et al.

(10) Patent No.: US 6,929,480 B2
(45) Date of Patent: Aug. 16, 2005

(54) SKYDIVING SIMULATOR AND SKYDIVING TRAINING PROCESS USING THE SAME

(76) Inventors: Sung Taee Lee, 1027ho, Euksa Apt., Gongneung 2-Dong, Nowon-gu, Seoul 139-772 (KR); Byung Ho Park, 1267, 1-gu, Seungun-ri, Anmyun-eup,Taean-gun, Chungchongnam-do 357-960 (KR)

( * ) Notice: Subject to any disclaimer, the term of this patent is extended or adjusted under 35 U.S.C. 154(b) by 378 days.

(21) Appl. No.: 10/240,208

(22) PCT Filed: Mar. 21, 2002

(86) PCT No.: PCT/KR02/00480

§ 371 (c)(1),
(2), (4) Date: Sep. 27, 2002

(87) PCT Pub. No.: WO02/076829

PCT Pub. Date: Oct. 3, 2002

(65) Prior Publication Data

US 2003/0113695 A1 Jun. 19, 2003

(30) Foreign Application Priority Data

Mar. 22, 2001 (KR) .......................... 2001-14971

(51) Int. Cl.[7] .............................................. G09B 19/00
(52) U.S. Cl. ....................... 434/258; 434/247; 434/365; 472/49
(58) Field of Search ................................ 434/258, 365; 472/49

(56) References Cited

U.S. PATENT DOCUMENTS 4,073,188 A  *  2/1978  Slezinger et al. ............. 73/147
4,578,037 A      3/1986  Macangus et al.
5,593,352 A      1/1997  Methfessel et al.
5,655,909 A      8/1997  Kitchen et al.
6,000,942 A  * 12/1999  Hogue et al. ................. 434/30
6,139,439 A  * 10/2000  Ure ............................. 472/136
6,805,558 B1 * 10/2004  Carl et al. ................... 434/258

FOREIGN PATENT DOCUMENTS

JP    08-173583 A    7/1996
JP    08-182787 A    7/1996
JP    08-182788 A    7/1996
JP    08-244690      9/1996
JP    09-104398      4/1997
JP    10-156047      6/1998

\* cited by examiner

Primary Examiner—Chanda L. Harris
Assistant Examiner—John Sotomayor
(74) Attorney, Agent, or Firm—Sheridan Rose PC

(57) ABSTRACT

The object of this invention is to provide a skydiving simulator and a skydiving training process using the simulator, which simulates the environment and other conditions for purposes of skydiving training as if a skydiver performed a real skydiving process from the step of riding in an airplane to the step of landing on the ground. This simulator consists of a model fuselage (10), a rotary hanger unit (30) supporting a skydiver having jumped from the fuselage, and two fan units (40, 50) horizontally and upwardly forcing air currents into an open simulation space into which the skydiver jumps from the fuselage. Wind velocity sensors (46, 56) sense the velocities of the air currents from the two fan units, and CCD cameras (47, 57) produce images of the skydiver during the training process, and a central control unit (CCU, 60) controls the simulator and the process in real time.

14 Claims, 16 Drawing Sheets

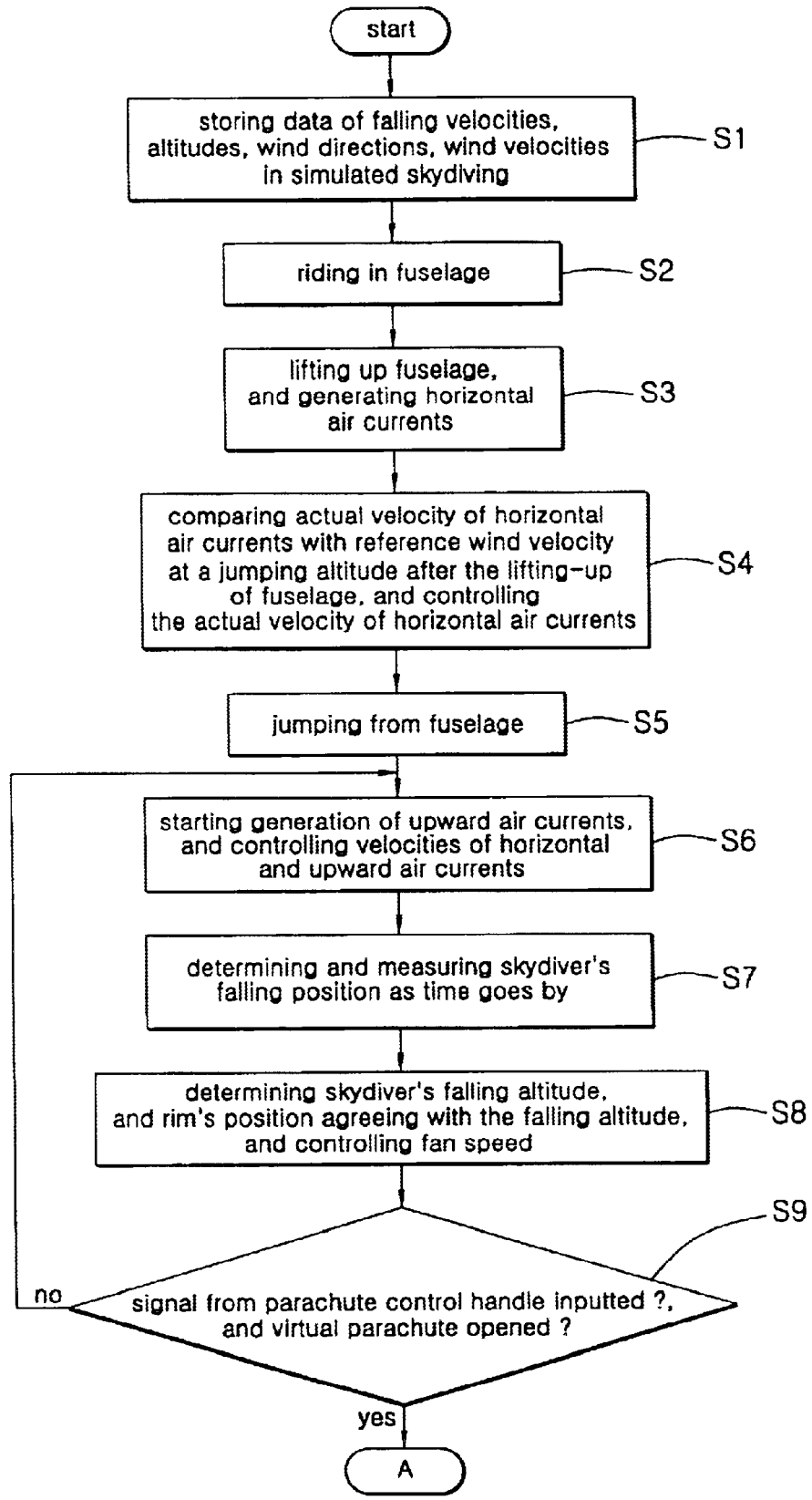

SKYDIVING SIMULATOR AND SKYDIVING TRAINING PROCESS USING THE SAME

TECHNICAL FIELD

The present invention relates, in general to a skydiving simulator and a skydiving training process using the simulator and more particularly, to a skydiving simulator and a skydiving training process using the simulator, which simulates the environment and other conditions for purposes of skydiving training as if a skydiver performed a real skydiving process from the first step of riding in an airplane to the last step of landing on the ground thus allowing the skydiver to train for skydiving in a highly active and realistic fashion the skydiving simulator and the simulated skydiving training process of this invention also checking and controlling the position and posture of the skydiver in a real time during a skydiving training process, and recording a variation in the position and posture of the skydiver by a video recording medium and reproducing, the recorded data to analyze the skydiver's position and posture after finishing the skydiving training process, and reducing the installation and maintenance cost of the simulators to improve economic efficiency of such simulators

BACKGROUND ART

As well known to those skilled in the art, a skydiving simulator allows skydivers to train for skydiving in a simulator, which is installed on a support surface on the ground and simulates the environment and other conditions for purposes of skydiving training as if the skydiver performs a real skydiving process from the first step of riding in an airplane to the last step of landing on the ground, thus allowing the skydivers to train for skydiving in a highly active and realistic fashion without requiring a real flight in an airplane. The skydiving simulator thus allows the skydivers to train for skydiving in spite of bad weather and protects unskilled skydivers from safety hazards unexpectedly occurring in the process of real skydivings, thus preventing such unskilled skydivers from being seriously injured by or suffering death from such safety hazards occurring in real skydiving. Another advantage of the skydiving simulators resides in that the simulators allow skydivers to train for skydiving without a real flight of airplanes, and so the fuel of the airplanes is not used. The skydiving simulators thus save fuel of airplanes, and reduce the skydiving training cost.

An example of such skydiving simulators is referred to Japanese Patent Laid-open Publication No. Heisei 8-173583. As shown in FIGS. 1A and 1B of the accompanying drawings, the Japanese skydiving simulator comprises a skydiver support unit for supporting a skydiver, an actuating unit provided at the support unit for moving the skydiver, a limb movement sensor installed at the support unit for sensing movements of the limbs of the skydiver, a parachute sensor installed at the support unit for detecting, whether the skydiver manipulates a parachute control line to open his/her virtual parachute, and a control sensor installed at the support unit for detecting a displacement of the parachute control line manipulated by the skydiver. The simulator also includes a control unit, which receives signals outputted from the sensors, and operates the actuating unit in response to a signal from the limb sensor when the skydiver is in a horizontal position, thus changing the position of the support unit from a horizontal position to a vertical position in response to a signal from the parachute sensor, and thereby changing the horizontal position of the skydiver to a vertical position. That is, in response to a signal from the parachute sensor, the control unit operates the actuating unit to change the position of the skydiver from a free-falling mode position (horizontal position) to a parachuting mode position (vertical position). The control unit also operates the actuating unit in response to a signal from the control sensor when the skydiver is in the vertical position.

In a detailed description, the Japanese skydiving simulator comprises a tower platform 1 which is fixedly installed on a support surface on the ground, a skydiver support unit 5 which is provided at the platform 1 and supports a skydiver "P" at the platform 1, an upward fan unit 2 installed at the lower portion of an open simulation space and functioning to force air upward in the open simulation space to support the skydiver "P" in a weightless state by the air. A plurality of horizontal fall units 3 are regularly installed on the support surface to surround the open simulation space and functioning to force air horizontally into the simulation space. A control unit 4 is installed at the framework of the platform 1, and controllably operates the fan units 2 and 3 to force air upwardly and horizontally into the open simulation space, thus supporting the skydiver "P", who is suspended in the simulation space by the support unit 5, in a weightless state while repeatedly changing the horizontal and vertical positions of the skydiver "P" and allowing the skydiver "P" to train for skydiving in the simulator.

In the above simulator, a plurality of sensors and signal transmitting wires are attached to the body and limbs of a skydiver for monitoring the position and posture of the skydiver floating in a weightless state by the air in the simulation space, and simulating the environment and other conditions agreeing with the position, posture and intention of the skydiver. However, the sensors and signal transmitting wires do not allow the skydiver to train for skydiving in the simulator in a highly active and realistic fashion, and force the skydiver to excessively waste labor and time while preparing for the skydiving training.

The Japanese skydiving simulator does not have any means for analyzing the position, posture and intention of a skydiver in real time using input signals or means for allowing a trainer to control and communicate with the skydiver in real time. Therefore, during a skydiving training process using the simulator, the trainer must use a megaphone to give instructions to the skydiver floating in the simulation space, and this reduces the activity and realism of the skydiving training using the simulator.

In addition, the tower platform of the above simulator is not movable, but is fixed on a support surface, and so the simulator does not simulate a horizontal flight of an airplane. Therefore, the simulator does not allow a skydiver to train for free-falling using his/her body to control direction and movements just after jumping from a real airplane in horizontal flight. Another disadvantage of the above simulator resides in that it cannot simulate the environment or other conditions for purposes of training for jumping from an airplane, even though the training for jumping is one of the very important steps of the skydiving training process. Particularly, the jumping from a real airplane at a high altitude while skydiving is the step which typically strikes a beginner or an unskilled skydiver with fear and sometimes causes safety hazards, and so it is necessary for such beginners or unskilled skydivers to repeatedly train for the jumping on the ground until they are quite experienced in the jumping. Thus the Japanese skydiving simulator has a fatal defect in that it does not simulate the environment or other conditions for purposes of training for such jumping.

While carrying out a skydiving training process using a real airplane, some beginners refuse to jump from a flying airplane at a high altitude since they are struck with fear. In addition, a skydiver may unfortunately strike his/her head against the fuselage of the flying airplane and lose his/her senses while free-falling when the skydiver fails to successfully jump from the airplane by a sufficient distance in the case of jumping from the airplane. Furthermore, some skydivers jumping from a flying airplane may feel that their helmets and parachute backpacks are removed from them in strong wind currents, and are thrown into confusion since they jump from the airplane as if they were abruptly thrown from the interior of the fuselage into strong wind currents. In such a case, the skydivers while free-falling may fail to attain agreeable positions or postures, which have been experienced through repeated skydiving training processes.

It is thus apparent that skydiving simulators must allow skydivers to train for jumping. However, the above-mentioned Japanese skydiving simulator does not provide any realism or simulate the environment or other conditions for purposes of training for the jumping from an airplane flying at a high altitude. In addition, the simulator does not allow a skydiver to perform a skydiving training process while alone.

In the above Japanese skydiving simulator, it is necessary to force air into the simulation space in all directions using the fixed fan units, and so an excessive number of large-scaled fan units must be used. This increases the installation and maintenance cost of the skydiving simulators. In addition, the air from the fan units of the above simulator is forced into the simulation space without being guided by any guiding means, and so the simulator results in excessive energy loss and is low in its economic efficiency.

When it is required to increase the altitude for free-falling in an effort to allow the skydivers to train for skydiving in a highly active and realistic fashion using the simulator, the simulator including the tower platform and fan units must be increased in its scale, and forces the owner of the simulator to pay excessive money for installation and maintenance of the simulator. This results in a further reduction in the economic efficiency of the simulator.

Another example of conventional skydiving simulators is referred to Japanese Patent Laid-open Publication No. Heisei. 8-182787, disclosing a simulator for skydiving and parachuting training. As shown in FIGS. 2A and 2B of the accompanying drawings, the above simulator comprises a simulation chamber, a skydiver suspending unit, an upward fan unit for functioning to force air upward in the simulation chamber to support a skydiver in a weightless state, a parachute sensor for detecting whether the skydiver manipulates a parachute control line to open his/her virtual parachute or not, a control sensor for detecting a skydiver's manipulation of the control line after the skydiver manipulates the control line, and a plurality of horizontal fan units for functioning to force air horizontally into the simulation chamber after the control line is manipulated. The simulator also includes a control unit, which receives signals from the sensors, and controls the upward fan unit so as to make the upward fan unit force air into the simulation chamber such that the skydiver, supported in a weightless state by the air, floats down slowly in the simulation chamber when the skydiver manipulates the parachute control line to open the virtual parachute. The control unit also controls the horizontal fan units in response to the input signals from the sensors. The simulator further includes an image projecting unit for projecting a moving image, which allows the skydiver to feel the sensation of falling in the air, in response to a control signal outputted from the control unit, and an image display unit for displaying the moving image projected from the image projecting unit.

In other words, this Japanese simulator has the closed simulation chamber "R" which is formed in a fixed facility "S", and the upward fan unit 7 upwardly forcing air into the chamber "R" through an air guide tunnel 6 to support the skydiver "P" in a weightless state by the air, and the horizontal fan units 9 horizontally forcing air into the chamber "R" to adjust the position of the skydiver "P" in the chamber "R". That is, this simulator allows a skydiver to train for skydiving and parachuting in a closed simulation chamber The above skydiving and parachuting simulator is advantageous in that it prevents leakage of wind currents from the simulation chamber, thus reducing energy loss. However, this simulator is problematic in that it is too low in its economic efficiency since the scale of the facility "S" must be excessively enlarged when it is desired to provide a skydiver with a sufficient space capable of allowing the skydiver to freely move and take desired positions and postures in the simulation chamber. When a skydiver fails to have a good position or a good posture while floating in the chamber "R", the skydiver may crash into the sidewall of the chamber "R" to be injured. Another disadvantage of this simulator resides in that the skydiving and parachuting process using the simulator is poor in its realism and activity.

As apparent from the above description, the skydiving and parachuting simulator of Japanese Patent Laid-open Publication No. Heisei. 8-182787 has the construction similar to that of the simulator disclosed in the above-mentioned Japanese Patent Laid-open Publication No. Heisei. 8-173583, and so the skydiving and parachuting simulator cannot overcome the above-mentioned problems.

In an effort to overcome such problems experienced in the conventional skydiving simulators, the inventor of this invention has actively developed a skydiving simulator, which simulates the environment and other conditions for the purposes of skydiving training as if skydivers jumped from a real airplane flying in the sky, different from the conventional skydiving simulators designed to only allow skydivers to train for skydiving in fixed systems. This inventor also has developed a skydiving training process using the simulator, which comprises the first step of riding in a model fuselage, a second step of jumping from the model fuselage simulating the environment and other conditions of a real flight, and free-falling in the air using the body of a skydiver to control direction and movements, the third step of opening a parachute and floating down in the air, and the last step of landing on the ground, and which thus allows skydivers to train for skydiving in a highly active and realistic fashion using the simulator.

This inventor also has studied a skydiving simulator and a skydiving training process using the simulator, which allows a skydiver to participate in the skydiving training process while wearing only a harness and an HMD (head-mounted display) so as to allow the skydiver to feel realism as if he/she performed real skydiving from a real airplane flying in the sky. The skydiving simulator and skydiving training process proposed by this inventor thus allows skydivers to freely move and have desired positions and postures while training in the simulator and prevents a leakage of wind currents, generated from a fan unit, from the simulator, thus accomplishing desired economic efficiency of skydiving simulators.

The simulator of this invention has a plurality of vertical and horizontal CCD-cameras (charge coupled device camera), and records a variation in the position and posture of a skydiver during a skydiving training process on a video recording medium by a video recorder, and controls the position, posture and movements of the skydiver in real time, and reproduces the recorded data to analyze the skydiver's position and posture after finishing the skydiving training process, thus improving the training effect.

The inventor of this invention has endeavored to reduce the installation and maintenance cost of skydiving simulators in an effort to improve economic efficiency of such simulators, even though the simulators simulate the desired environment and other conditions for the purposes of skydiving training in a highly active and realistic fashion.

DISCLOSURE OF THE INVENTION

Accordingly, the present invention has been made keeping in mind the above problems occurring in the prior art, and an object of the present invention is to provide a skydiving simulator and a skydiving training process using the simulator, Which simulates the environment and other conditions for purposes of skydiving training as if a skydiver performed a real skydiving process from the first step of riding in an airplane to the last step of landing on the ground, thus allowing the skydiver to train for skydiving in a highly active and realistic fashion and improving the skydiving training effect.

Another object of the present invention is to provide a skydiving simulator and a skydiving training process using the simulator, which simulates the environment and other conditions for purposes of skydiving training as if the skydiver performed a real skydiving process, thus allowing beginners or unskilled skydivers to become proficient in skydiving as a result of repeated training processes safely performed on the ground, and saving them from being struck with fear when jumping from a real airplane at a high altitude while really skydiving, and protecting them from unexpected safety hazards during such real skydiving.

A further object of the present invention is to provide a skydiving simulator and a skydiving training process using the simulator, which checks and controls the position and posture of a skydiver in real time, and records a variation in the position and posture of the skydiver on a video recording medium by a video recorder, and reproduces the recorded data to analyze the skydiver's position and posture after finishing a skydiving training process.

Still another object of the present invention is to provide a skydiving simulator and a skydiving training process using the simulator, which reduces the installation and maintenance cost of such simulators, and reduces a leakage of air currents from the simulator to reduce energy loss to the minimum during a training process, and which thus has improved economic efficiency.

BRIEF DESCRIPTION OF THE DRAWINGS

The above and other objects, features and other advantages of the present invention will be more clearly understood from the following detailed description taken in conjunction with the accompanying drawings, in which:

FIGS. 1A and 1B are perspective views showing the operation of a conventional skydiving simulator, in which:

FIG. 1A shows the simulator with a skydiver supported in a horizontal position; and FIG. 1B shows the simulator with the skydiver supported in a vertical position;

FIGS. 11A and 11B are flowcharts of the simulated skydiving training process according to this invention.

BEST MODE FOR CARRYING OUT THE INVENTION

Figure 1A:
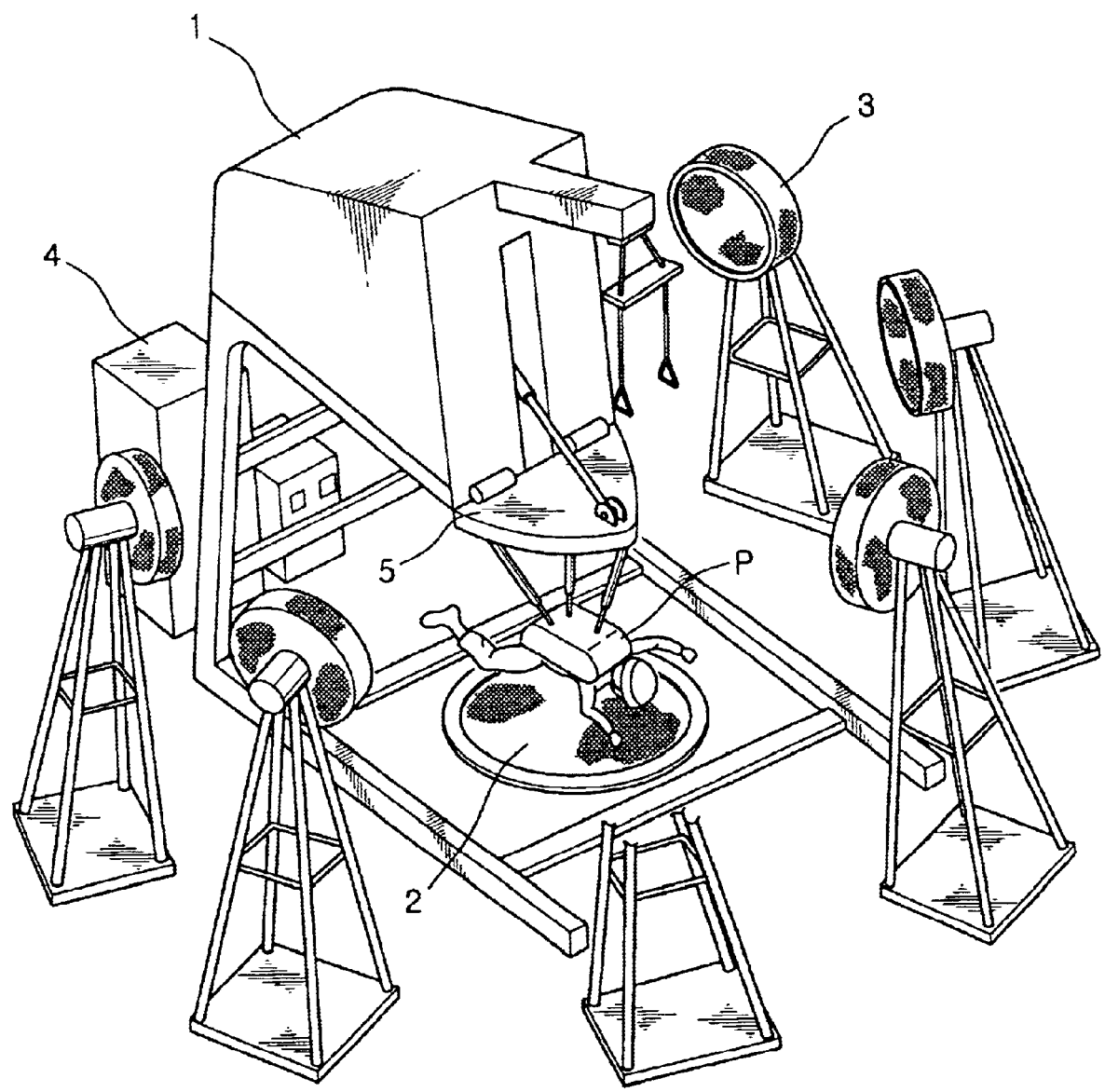
Figure 1B:
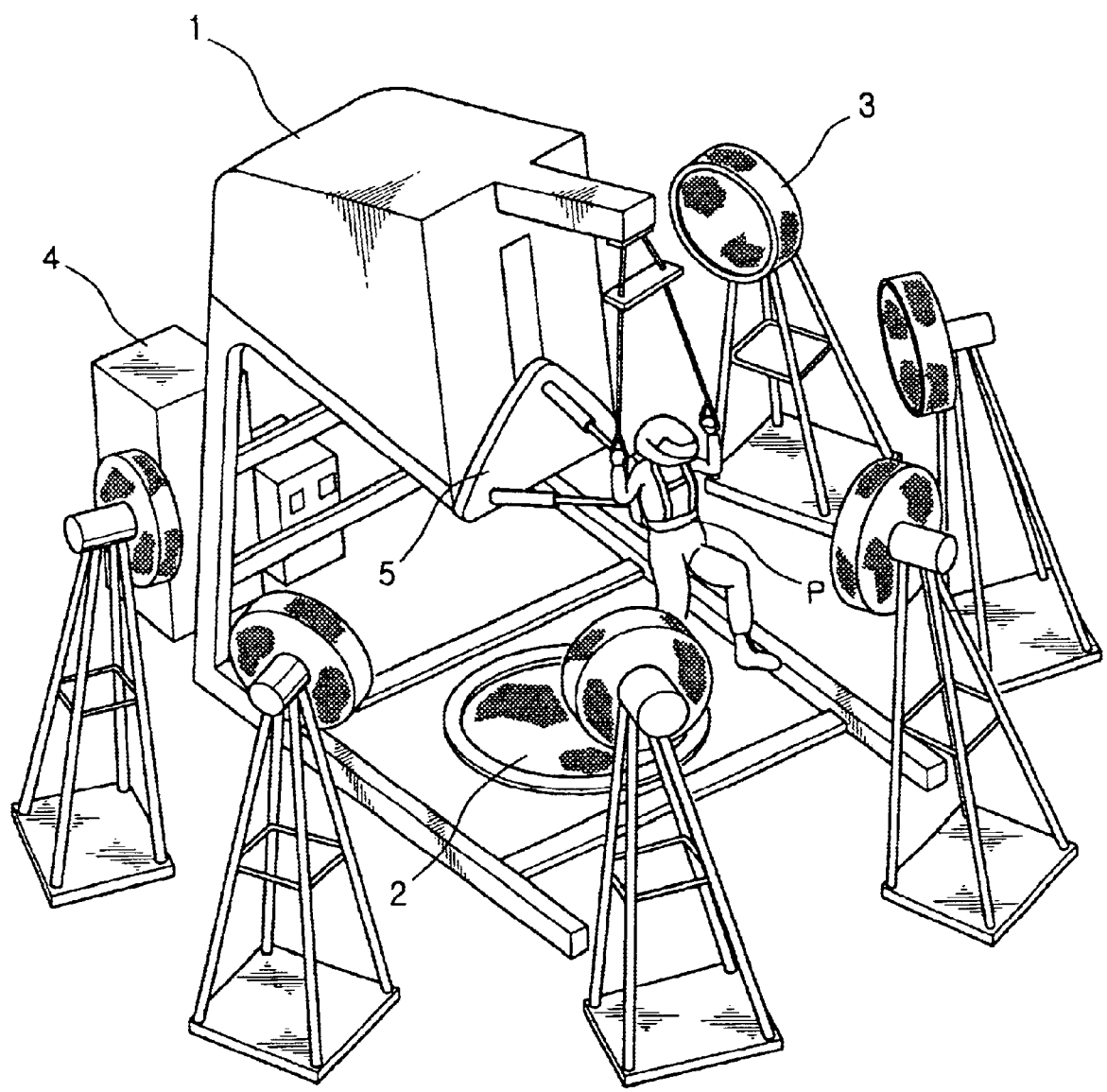
Figure 2A:
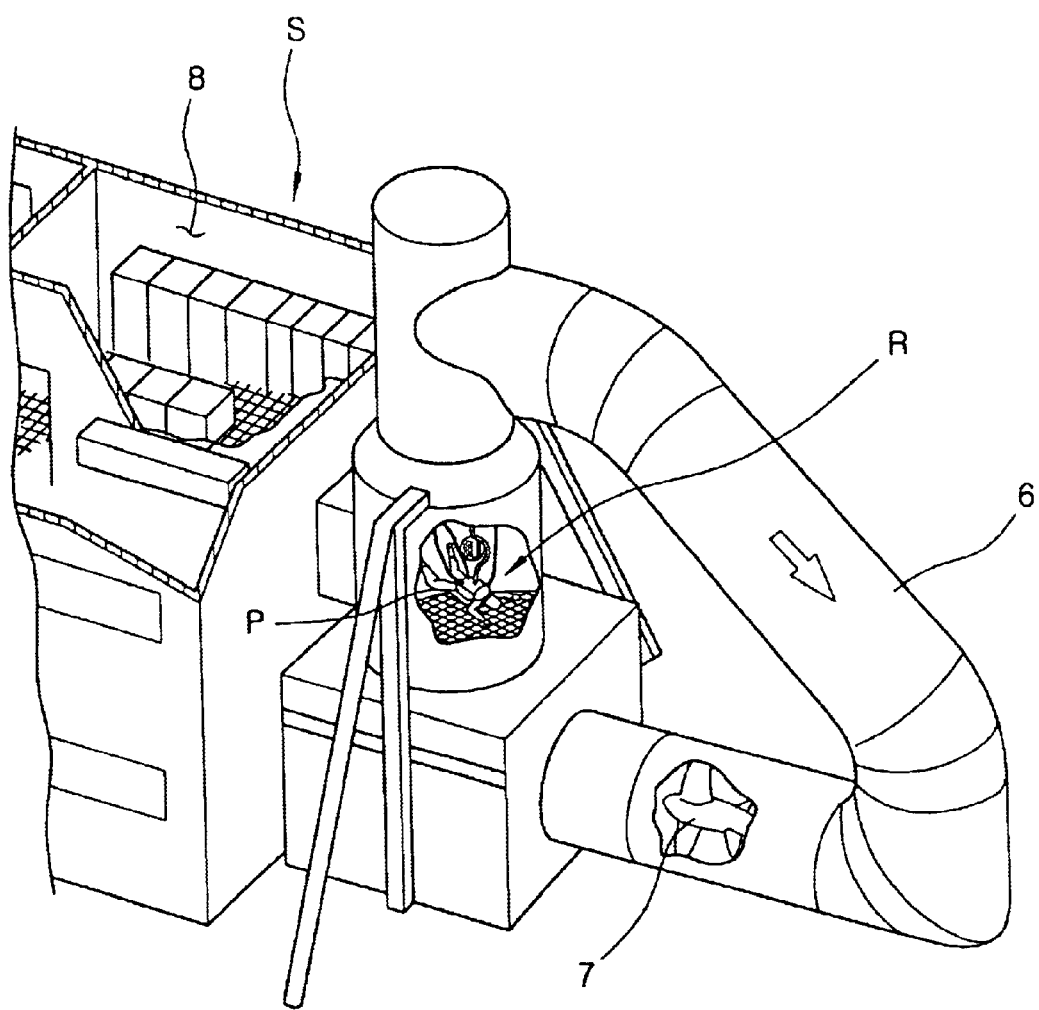
FIG. 2A is a perspective view of another conventional skydiving simulator with a closed simulation chamber for supporting a skydiver by air.
Figure 2B:
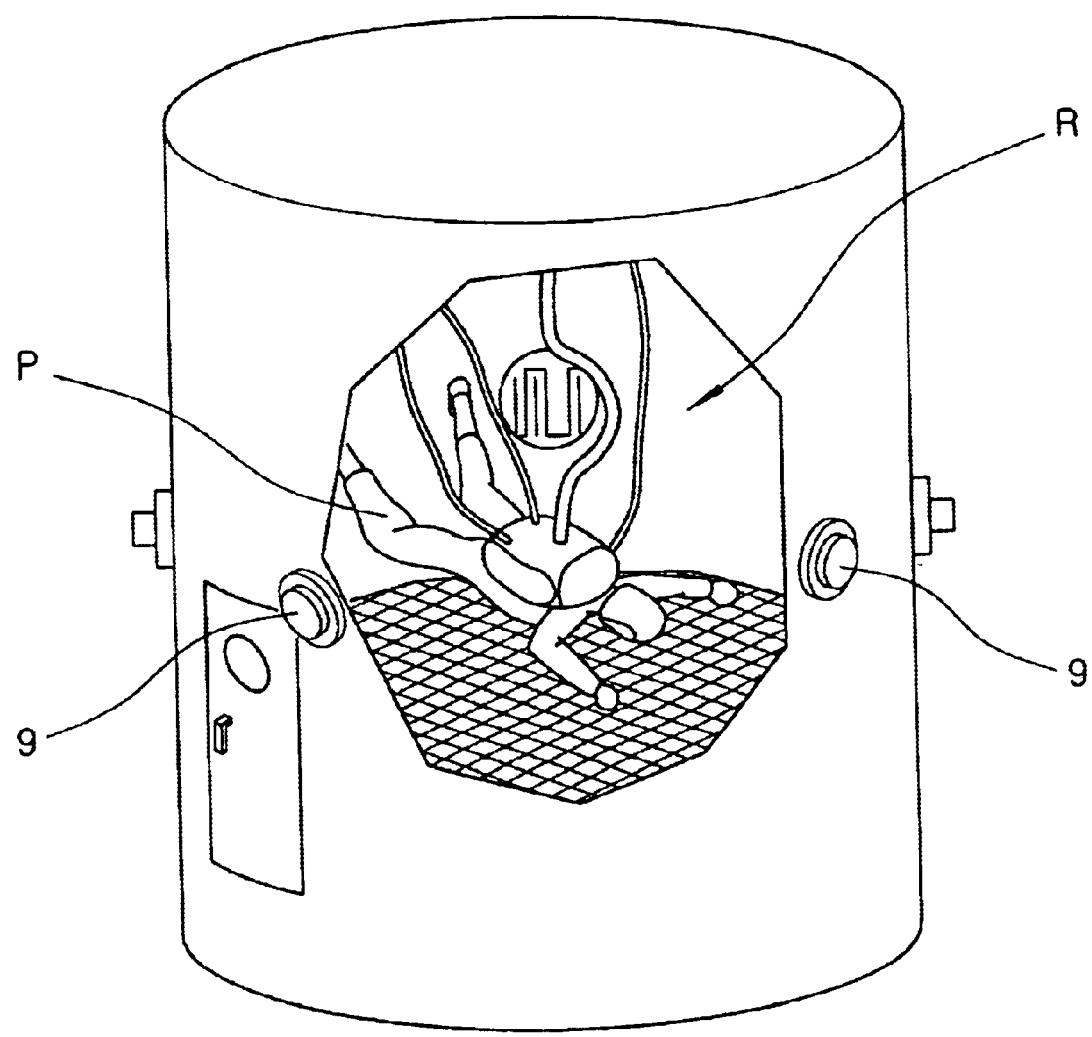
FIG. 2B is an enlarged perspective view of the closed simulation chamber of the simulator of FIG. 2A, showing a position of a skydiver supported by air within the chamber.

Reference should now be made to the drawings, in which the same reference numerals are used throughout the different drawings to designate the same or similar components.

The construction of the skydiving simulator according to the preferred embodiment of the present invention will be briefly described with reference to FIGS. 3A to 9 prior to a detailed description of the elements of the simulator. As shown in the drawings, the skydiving simulator of this invention comprises: a model fuselage 10 for loading a skydiver therein; a fuselage drive unit 20 actuating the fuselage 10; a rotary hanger unit 30 mounted to the top wall of the fuselage 10 to be aligned with the central axis of a jumping door 13 and used for supporting the skydiver jumped from the jumping door 13 of the fuselage 10; a plurality of fan units 40 and 50 for horizontally forcing air into the front of the fuselage 10 in conjunction with a movement of the fuselage 10 actuated by the fuselage drive unit 20, and forcing air upward into an open simulation space when the skydiver jumps from the fuselage 10 into the open simulation space; a plurality of wind velocity sensors 46 and 56 for sensing the velocities of air currents generated by the fan units 40 and 50; a plurality of CCD cameras 47 and 57 producing images of the skydiver during a skydiving training process from the step of jumping from the fuselage 10 to the step of landing on the ground; and a central control unit (CCU) 60 installed in a control room "S" and controlling both the operation of the above-mentioned elements of the simulator and the training process of the skydiver in real time.

In a detailed description of the above-mentioned construction of this simulator, the model fuselage 10 has a rear door 11, which is opened or closed by cylinder actuators 12 of the fuselage drive unit 20 and provided with steps for allowing a skydiver to enter or exit the fuselage 10 as shown in FIGS. 3A, 3B, 4A, 4B and 5. After the skydiver enters the fuselage 10, the rear door 11 is lifted up by the actuators 12 to close the rear end of the fuselage 10. The fuselage 10 also has the jumping door 13 at a first sidewall thereof, thus allowing the skydiver to jump from the fuselage 10 through the jumping door 13.

The hanger support 14 is mounted to the fuselage 10. This hanger support 14 transversely extends along the external surface of the fuselage 10 such that the support 14 starts at an upper portion of a second sidewall of the fuselage 10 opposite to the jumping door 13, and transversely passes over the top wall of the fuselage 10 to reach a predetermined position above and in front of the jumping door 13. In such a case, the support 14 extends along a straight line, aligned with the central axis of the jumping door 13, while being constantly spaced apart from the external surface of the fuselage 10 by a gap, for example, about 1.5~2.0 cm, and is firmly mounted to the fuselage 10 using a plurality of nuts and bolts. The material of the hanger support 14 sufficiently supports a total weight of the rotary hanger unit 30 and the skydiver "P". The rotary hanger unit 30 will be described in detail later herein.

A lifting arm 21 is shafted at its end to an idle bearing 22 provided at a predetermined position of the second sidewall of the fuselage 10. The idle bearing 22 is designed to idle-rotate on the fuselage 10, and so it allows the fuselage 10 to be lifted up or lowered down by an actuation of the lifting arm 21 while maintaining in a horizontal position. The lifting arm 21 will be described in detail later herein.

As shown in FIGS. 3A, 3B, 4A and 4B, the fuselage drive unit 20 actuates the fuselage 10 of this simulator. This fuselage drive unit 20 consists of the idle bearing 22 provided at the second sidewall of the fuselage 10, and the lifting arm 21, which has a predetermined length and is coupled at a first end thereof to the bearing 22, and at a second end thereof to the rotating shaft of a hydraulic actuator, which is installed on the ground for actuating the lifting arm 21. That is, the lifting arm 21 is shafted at its first end to the bearing 22, and at its second end to the rotating shaft of the hydraulic actuator installed on the ground, and so the arm 21 rotates up and down by the hydraulic actuator. In accordance with an upward or downward rotating action of the lifting arm 21 by an actuation of the lifting arm actuator, the fuselage 10 coupled to the first end of the lifting arm 21 is lifted up or lowered down. In the present invention, it is possible for the fuselage drive unit 20 to use a pneumatic actuator in place of the hydraulic actuator without affecting the functioning of this invention. The rear door actuators 12 and the lifting arm actuator, constitute the fuselage drive unit 20.

As shown in FIGS. 5, 6, 7A, 7B and 8, the rotary hanger unit 30 consists of a rotary disc 31, which is coupled to the outside end of the hanger support 14 projecting to a predetermined position above and in front of the jumping door 13 of the fuselage 10. A disc drive motor "M" is included in the rotary hanger unit 30 for rotating the rotary disc 31 clockwise or counterclockwise. This rotary hanger unit 30 suspends a skydiver "P", and controls the position of the skydiver during a skydiving training process.

The rotary disc 31 is rotatably coupled to the outside end of the hanger support 14 of the fuselage 10 using a rotating shaft assembly 35 and a bearing 36. The disc drive motor "M" used for rotating the rotary disc 31 is mounted to the lower surface of the hanger support 14. The drive motor "M", shaft assembly 35 and bearing 36 form a rotary disc drive unit.

A plurality of take-up rollers 33a and 33b with skydiver hanging ropes 34a and 34b are installed in the rotary disc 31. The rotary disc 31 also has a plurality of roller drive motors 32a and 32b used for rotating the rollers 33a and 33b to wind or unwind the ropes 34a and 34b under the control of the CCU 60. The CCU 60 is connected to the roller drive motors 32a and 32b through a plurality of signal transmitting wires.

The rotating shaft assembly 35 is coupled to the center of the rotary disc 31, and consists of a rotary contact shaft 37 provided at its lower portion and a fixed contact shaft 38 provided at its upper portion. The rotary contact shaft 37 is fixed to the top wall of the rotary disc 31 and is rotated together with the disc 31, while the fixed contact shaft 38 is fixed to the hanger support 14 by a metal connector "B" that is also fixed to the top surface of the hanger support 14. A cylindrical insulator 38 is vertically set in the shaft assembly 35 to divide the interior of the shaft assembly 35 into inside and outside shafts. The rotating shaft assembly 35 is thus rotated along with the rotary disc 31 while preventing a twisting of the signal transmitting wires used for transmitting signals from the CCU 60 to the motors 32a and 32b.

In such a case, the first parts of the signal transmitting wires, extending from the roller drive motors 32a and 32b to the rotary contact shaft 37, are respectively jointed to the inside and outside shafts of the shaft assembly 35 at the lower end of the assembly 35, thus accomplishing the signal transmission between the motors and rotary contact shaft. The signal transmission between the rotary and fixed contact shafts 37 and 38 is accomplished at the contact junction of the two shafts 37 and 38. The second parts of the signal transmitting wires, extending, from the CCU 60 to the fixed contact shaft 38, are respectively jointed to the inside and outside shafts of the shaft assembly 35 at the upper end of the assembly 35, thus accomplishing the signal transmission between the CCU and the fixed contact shaft. Therefore, the roller drive motors 32a and 32b of the rotary, disc 31 are operated in response to control signals outputted from the CCU 60.

The skydiver hanging ropes include a shoulder hanging rope 34a for supporting the shoulders of a skydiver "P" and a waist hanging rope 34b supporting the waist of the skydiver. A hook is attached to the end of each rope 34a, 34b, and is jointed to a ring provided at a harness "H" worn by the skydiver "P". The ropes 34a and 34b thus support the skydiver "P" jumping from the jumping door 13 of the fuselage 10 into an open simulation space.

Each of the take-up rollers 33a and 33b is rotated in opposite directions by an associated motor 32a, 32b, thus winding or unwinding the ropes 34a and 34b to control or adjust the position of the skydiver "P" supported by the hanging ropes, the hooks of which are jointed to the rings of the harness "H" of the skydiver "P".

When it is desired that the skydiver have a horizontal position of a free-falling mode, the ropes 34a and 34b are released from the rollers 33a and 33b by the same length. In such a case, an upward fan unit 50 forces air upward into the open simulation space, thus supporting the skydiver upward in a weightless state by the air in the open simulation space. When it is desired to change the free-falling mode horizontal position of the skydiver to a vertical position of a parachuting mode, the shoulder hanging rope 34a is appropriately wound around the take-up roller 32a such that the released part of the shoulder hanging rope 34a is shorter than that of the waist hanging rope 34b by a predetermined length. In such a case, a horizontal fan unit 40 forces air horizontally into the open simulation space, thus allowing, the skydiver "P" to take a desired vertical position in the open simulation space as if he/she floated down in the air using a real parachute. The upper fan unit 50 and the horizontal fan unit 40 will be described in detail later herein.

The process of controlling and adjusting the position of a skydiver in a free-falling, mode will be described herein below.

As described above, the rotating shaft assembly 35, coupled to the center of the rotary disc 31, consists of the rotary contact shaft 37 provided at its lower portion and fixed to the top wall of the rotary disc 31 to be rotated together with the disc 31, and the fixed contact shaft 38 provided at its upper portion and fixed to the hanger support 14 by the metal connector "B", and the cylindrical insulator 38 vertically set in the shaft assembly 35 to divide the interior of the shaft assembly 35 into inside and outside shafts.

During an operation of the simulator, the rotary disc 31 shafted to the hanger support 14 is rotated around the shaft assembly 35 by the disc drive motor "M". In such a case, the signal transmitting wires connecting the roller drive motors 32a and 32b to the rotary contact shaft 37 are rotated along with the rotary disc 31 in the same direction, and so the wires are not twisted. The fixed contact shaft 38 is inserted into the bearing 36 at its top end, and is fixed to the hanger support 14 by the metal connector "B". This fixed contact shaft 38 is thus not rotated in such a case.

When the rotary disc 31 is rotated as described above, the skydiver "P" who is suspended by the disc 31 and has a free-falling mode horizontal position, is rotated to adjust his/her direction, thus feeling as if he/she really flies in the air while free-falling after jumping from an airplane at a high altitude. In such a case, the two fan units 40 and 50 are controlled by the CCU 60 to change the directions of air currents generated by them, thus allowing the skydiver to change or adjust his/her position and posture.

As shown in FIGS. 3A, 3B, 4A and 4B, the two fan units 40 and 50 include the horizontal fan unit 40 and the upward fan unit 50. The horizontal fan unit 40 is installed in front of the fuselage 10, and is operated in conjunction with a lifted motion of the fuselage 10 to horizontally force air into the open simulation space such that strong air currents rush into the front of the fuselage 10. The upward fan unit 50 is installed under the fuselage 10 and functions to force air upward into the open simulation space, into which the skydiver jumps from the jumping door 13 or the fuselage 10 to be supported in a weightless state by the air.

The horizontal fan unit 40 consists of a horizontal fan 41, which is fixedly supported on the ground at a position in front of the fuselage 10 by a plurality of fixed support columns 42 and generates horizontally forced air. The upward fan unit 50 consists of an upward fan 51, which is fixedly supported on the ground at a position under the fuselage 10 by a plurality of fixed support columns 52 and generates upwardly forced air. Each of the two fan units 40 and 50 also has vertically extendible columns 44, 54 which are operated in conjunction with a movement of the fuselage 10, with an air guide tunnel 45, 55 connected at its first and second ends to the edge of an associated fan 41, 51 and the top ends of associated extendible columns 44, 54. In such a case, an air guide rim 43, 53 is mounted along the second end of each air guide tunnel 45, 55 and is coupled to the top ends of associated extendible columns 44, 54, thus controlling the height of the second end of the air guide tunnel 45, 55 from the ground in conjunction with a motion of the extendible columns 44, 54.

In a detailed description, the extendible columns 44 and 54 are used for adjusting the heights of the air guide rims 43, 53 from the ground such that the forced air from the fans 41 and 51 is changed in its forced direction in conjunction with a variation in the height of the fuselage 10 lifted up or lowered down by the fuselage drive unit 20. In the present invention, the extendible columns 44 and 54 may be designed to have a hydraulic cylinder actuator type mechanism or a pneumatic cylinder actuator type mechanism, and effectively simulate the environment and other conditions expected in real skydiving. Of course, it should be understood that the extendible columns may be designed to have a gear mechanism in place of the hydraulic cylinder actuator type mechanism and the pneumatic cylinder actuator type mechanism, without affecting the functioning of this invention.

In addition, each air guide tunnel 45, 55, which is connected at its first and second ends to the edge of an associated fan 41, 51 and the top ends of associated extendible columns 44, 54, preferably has a bellows structure fabricated using an elastic and flexible material. Due to such an elastic and flexible bellows structure the tunnels 45 and 55 easily extend or retract in accordance with a movement of the extendible columns 44 and 54.

The air guide rims 43 and 53 more effectively force air from the fan units 40 and 50 to the open simulation space without allowing a leakage of air, thus reducing energy loss to the minimum as well as accomplishing an improved skydiving training effect.

As shown in FIGS. 3A, 3B, 4A and 4B, the first and second wind velocity sensors 46 and 56 are respectively installed on the air guide rims 43 and 53 at predetermined positions, and sense the velocities of air currents generated by the fans 41 and 51, and output signals to the CCU 60, thus allowing the CCU 60 to control the velocities of air currents generated by the fans 41 and 51. That is, the two wind velocity sensors 46 and 56 are used for controlling the operation of the fan units 40 and 50 to force air currents with appropriate velocities agreeing with the simulated training conditions including a simulated jumping altitude, a simulated free-falling altitude and a simulated parachuting altitude. The two sensors 46 and 56 form a sensor unit.

As shown in FIGS. 3A, 3B, 4A and 4B, the CCD cameras 47 and 57 are respectively installed on the air guide rims 43 and 53 at predetermined positions, and produce images of the skydiver during a skydiving training process including the step of actuating the fuselage, the step of jumping from the fuselage, and the step of landing on the ground, and output signals to the CCU 60, thus allowing the images to be recorded on a video recording medium by a video recorder. The recorded images are reproduced to analyze the skydiver's position and posture after finishing the skydiving training process.

Due to such cameras 47 and 57, it is possible to check the position and posture of a skydiver during a training process, record images of the skydiver's position and posture on a video recording medium by the video recorder, and reproduce the recorded images to analyze the skydiver's position and posture during the training process. Therefore, the simulator of this invention does not require sensors, such as limb sensors, to be attached to the limbs of a skydiver, and allows the skydiver to train for skydiving in a highly active and realistic fashion, different from conventional skydiving simulators.

Figure 3A:
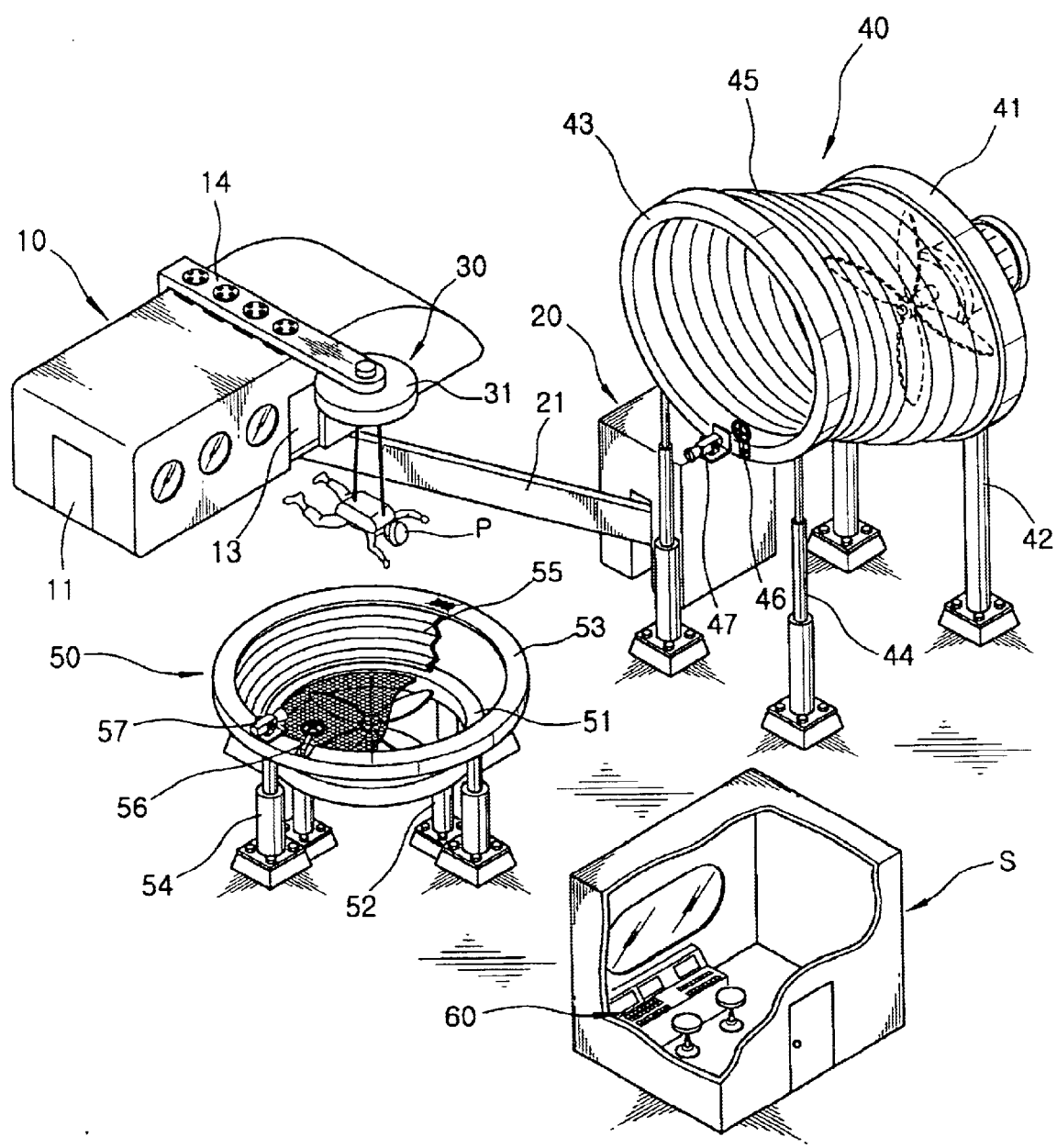
FIG. 3A is a perspective view of a skydiving simulator in accordance with the preferred embodiment of the present invention.
Figure 3B:
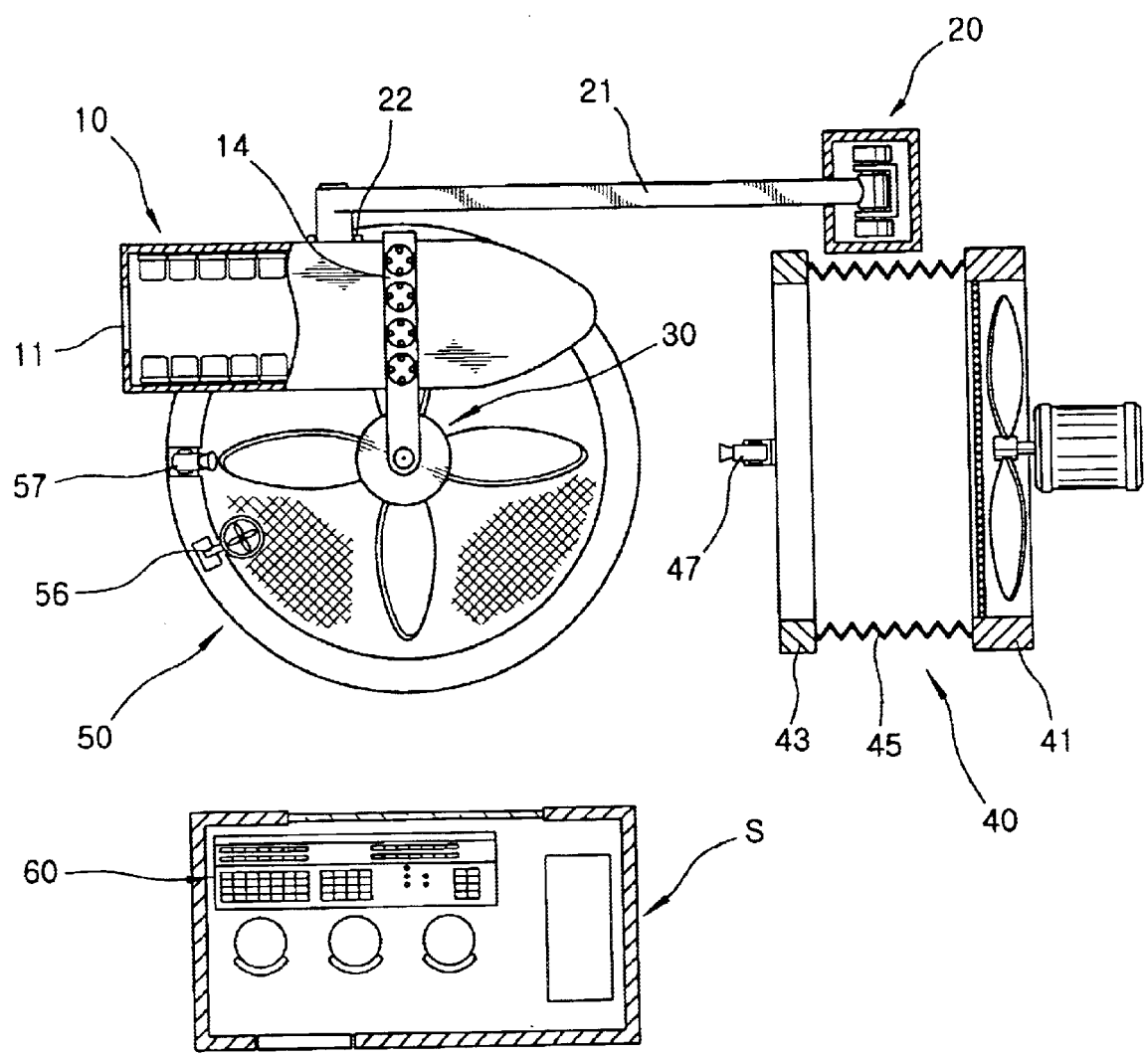
FIG. 3B is a plan view of the simulator of FIG. 3A.
Figure 4A:
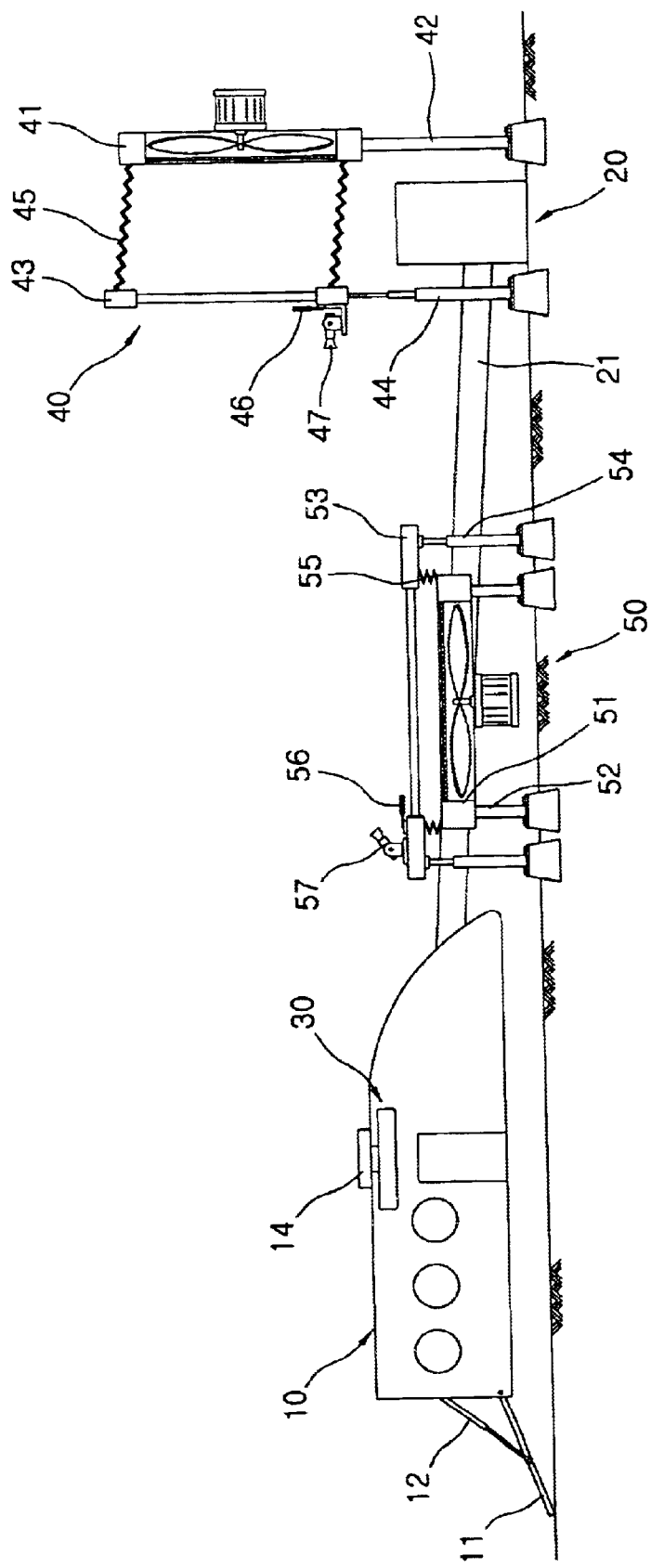
FIG. 4A is a side view of the simulator of this invention in an initial stage of its operation.
Figure 4B:
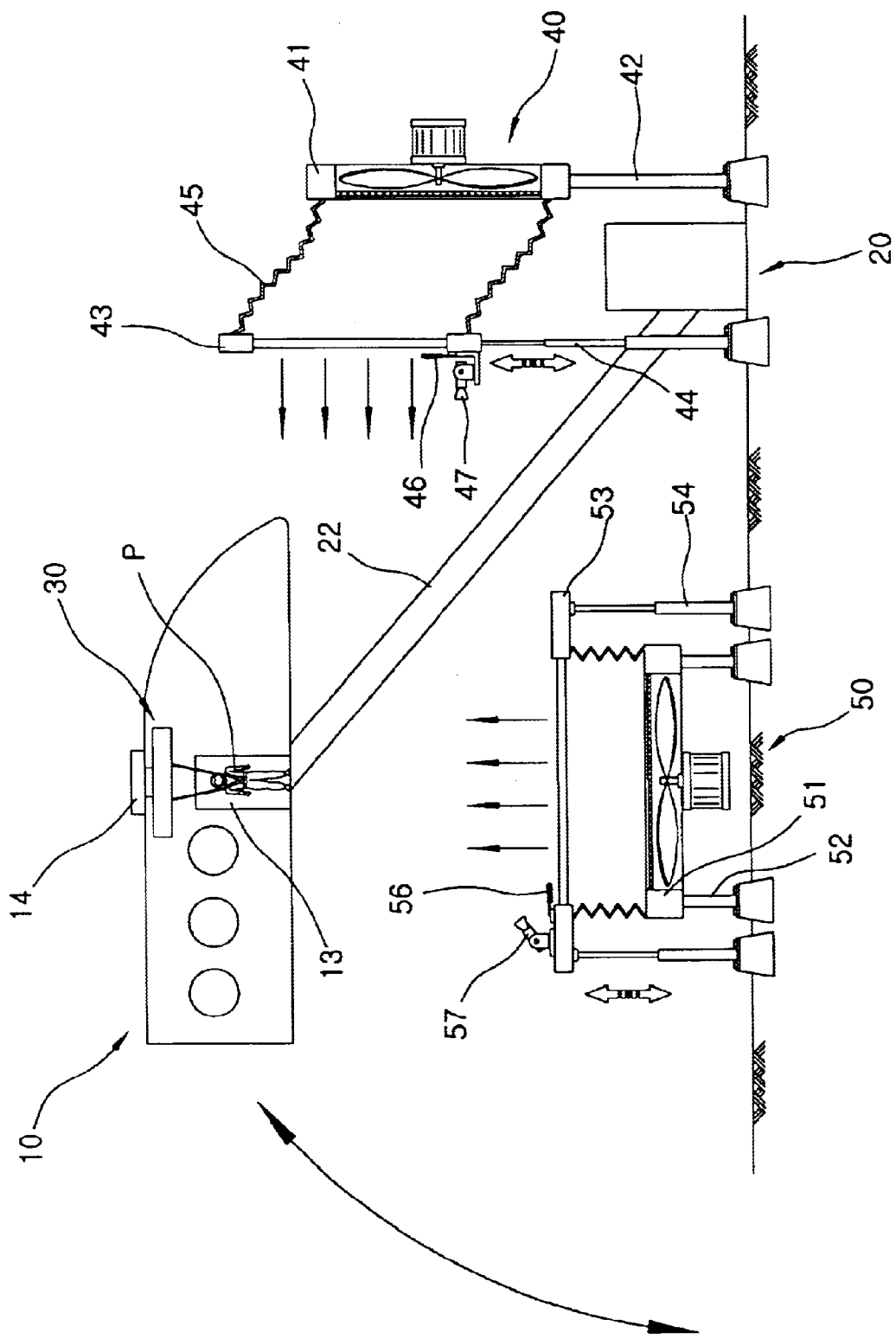
FIG. 4B is a side view of the simulator of this invention with a model fuselage of the simulator lifted up.
Figure 5:
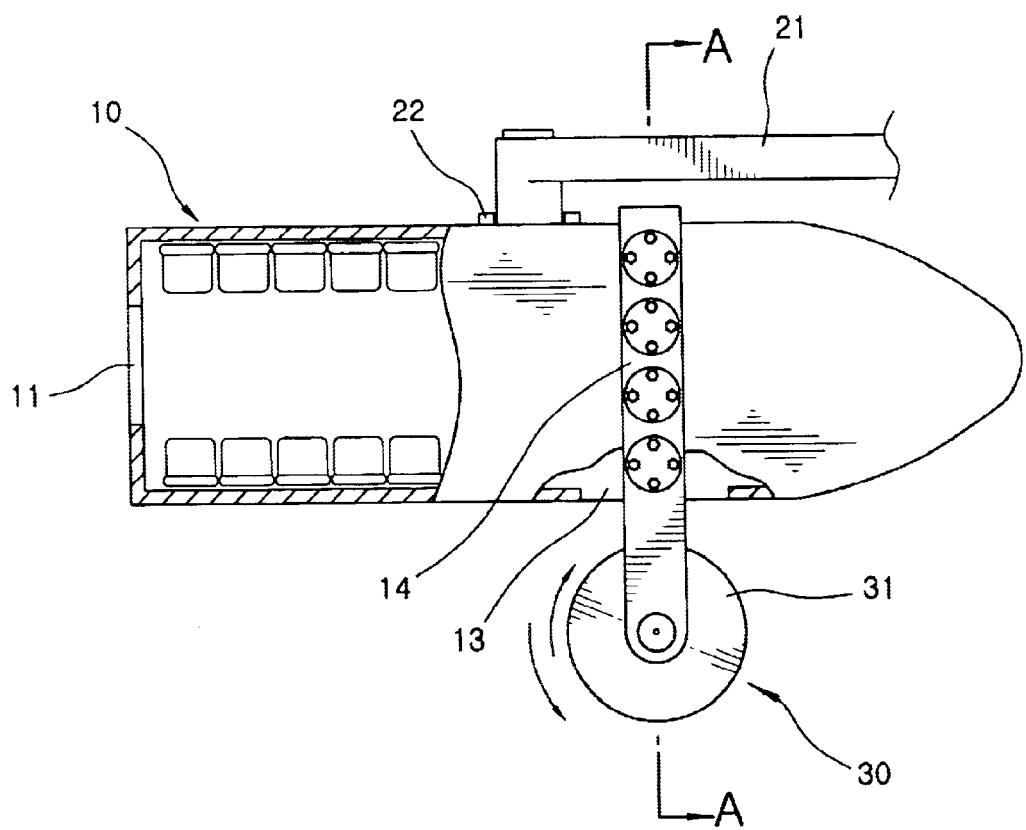
FIG. 5 is a partially exploded plan view showing a structure for mounting a rotary hanger unit to the model fuselage of this invention.
Figure 6:
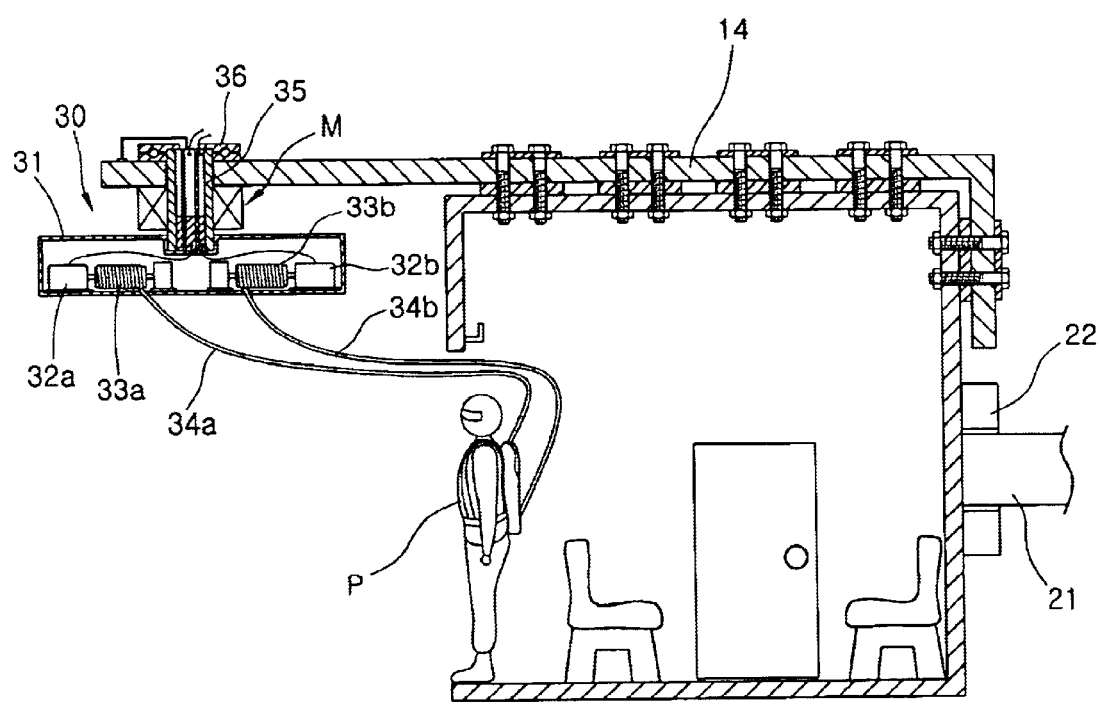
FIG. 6 is a side-sectional view taken along the line A—A of FIG. 5.
Figure 7A:
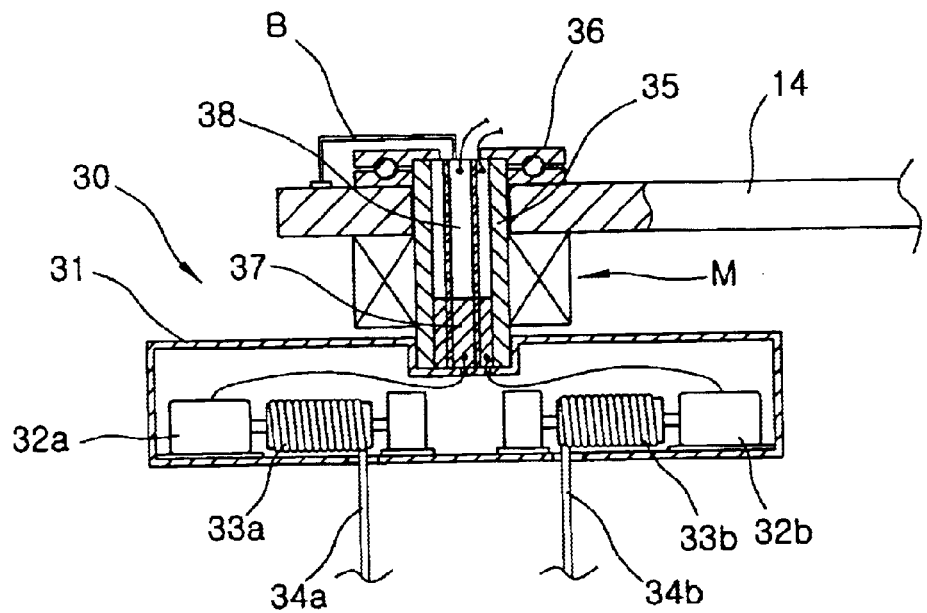
FIG. 7A is a sectional view showing a structure for coupling the rotary hanger unit of this invention to a hanger support.
Figure 7B:
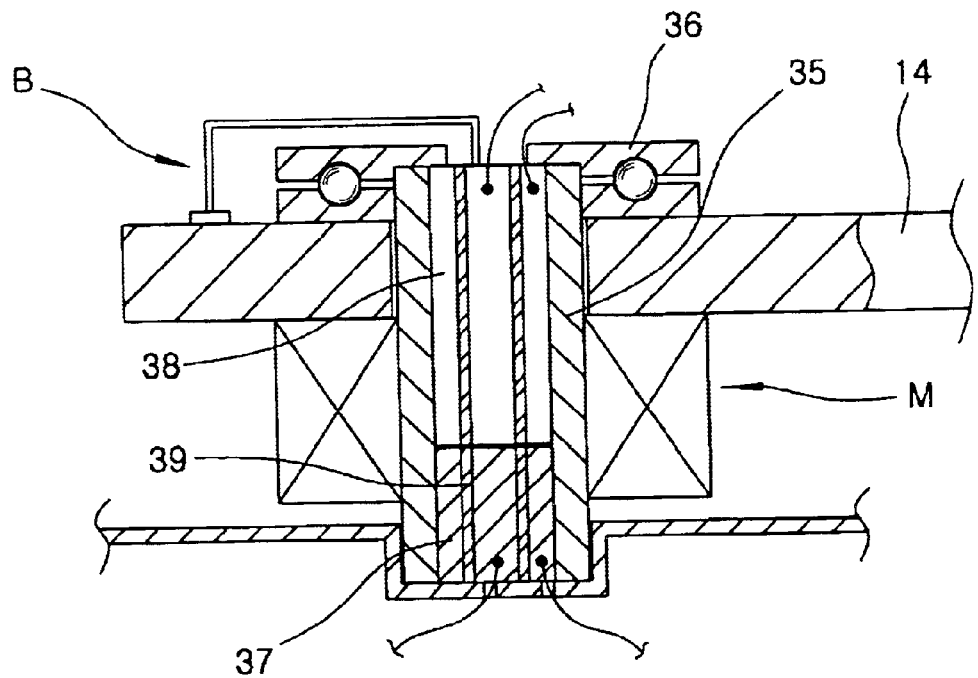
FIG. 7B is a sectional view of an important part of the rotary hanger unit of FIG. 7A.
Figure 8:
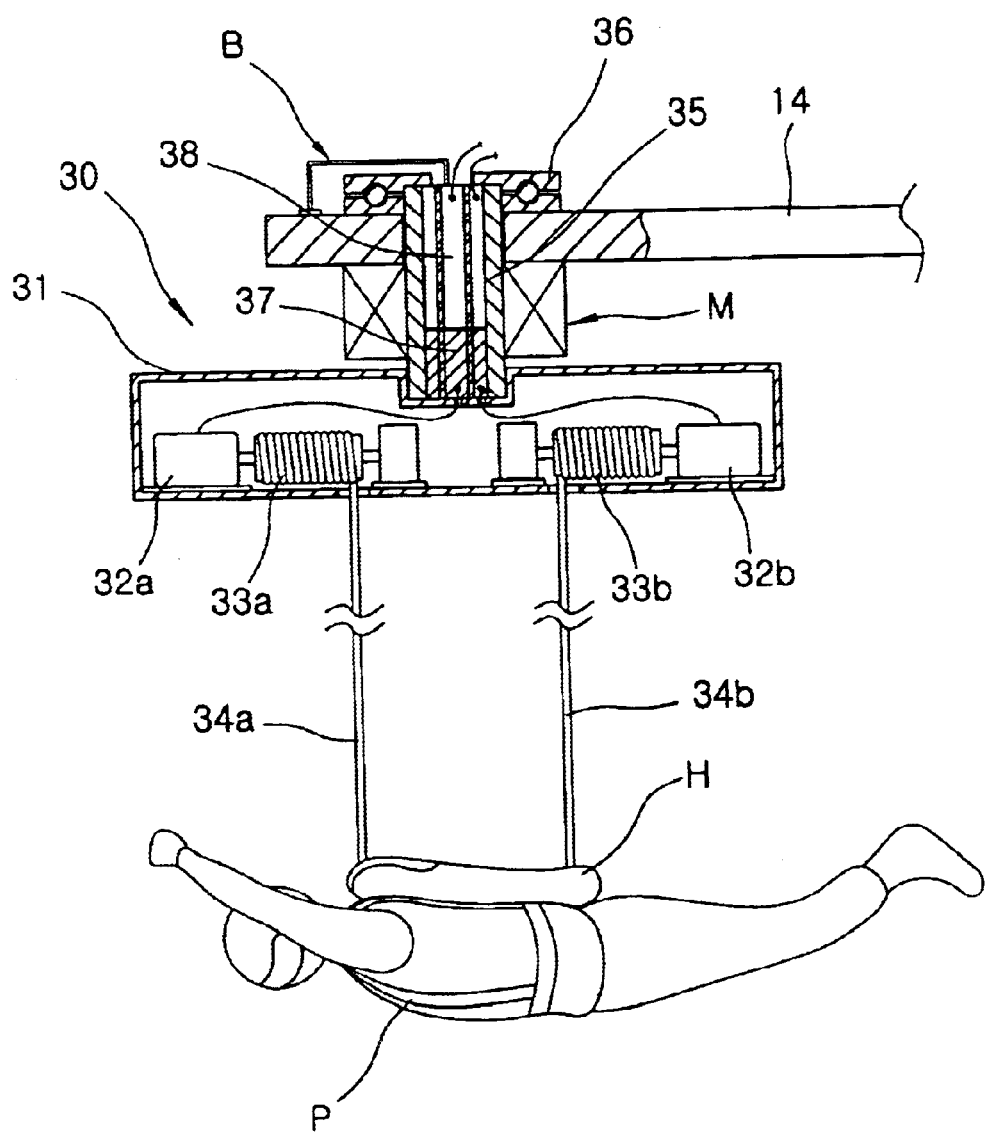
FIG. 8 is a side-sectional view of the rotary hanger unit of this invention, with a skydiver suspended by the hanger unit.
Figure 9:
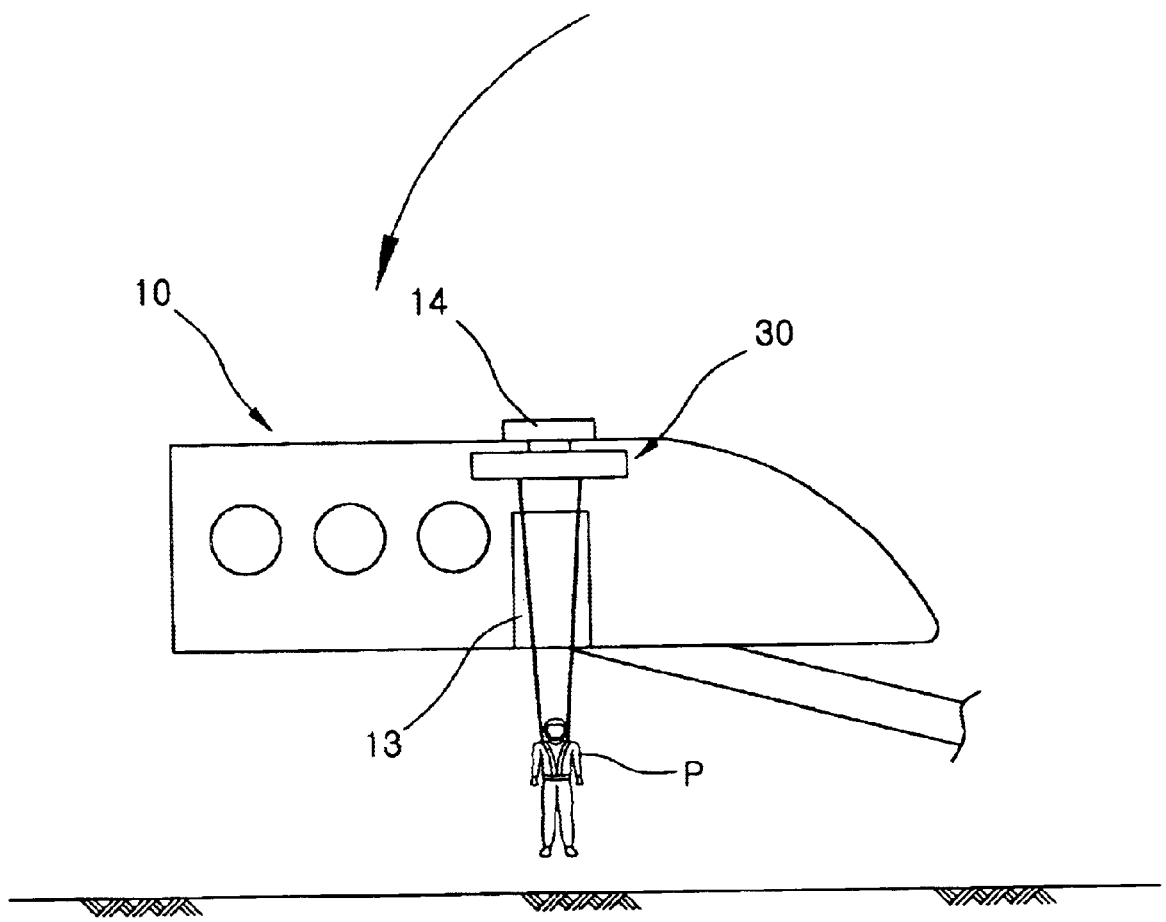
FIG. 9 is a side view showing the model fuselage of the simulator of this invention when the fuselage is lowered to land the skydiver on the ground.

As shown in FIGS. 3A and 3B, the CCU 60 is installed in the control room "S", and controls the simulator and the simulated skydiving training process in a real time. This CCU 60 consists of a controller for controlling the operation of the elements of the simulator, a database stored with a variety of data, such as wind velocity data, wind direction data, free-falling velocity data and parachuting velocity data, determined in accordance with jumping altitudes, free-falling altitudes and parachuting altitudes. The CCU 60 also includes an image signal transmitting unit for transmitting image signals, representing a variety of environmental conditions at take-off step, jumping step, free-falling step, and parachuting step, to the HMD worn on the head of the skydiver. The HMD forms an image display unit of the simulator. The video recorder and a video player are included in the CCU 60. The video recorder receives image signals outputted from the cameras, and records images of the skydiver, who performs a skydiving training process from the jumping step to the landing step, on a video recording medium. The video player is used for reproducing recorded images of the skydiver after the training process. The CCU 60 also has a communication network allowing the skydiver to communicate with a trainer in the control room in real time. The two cameras 47 and 57, and the video recorder form a video recording unit of the simulator.

The skydiving training process performed using the above-mentioned simulator will be described herein below.

Figure 10:
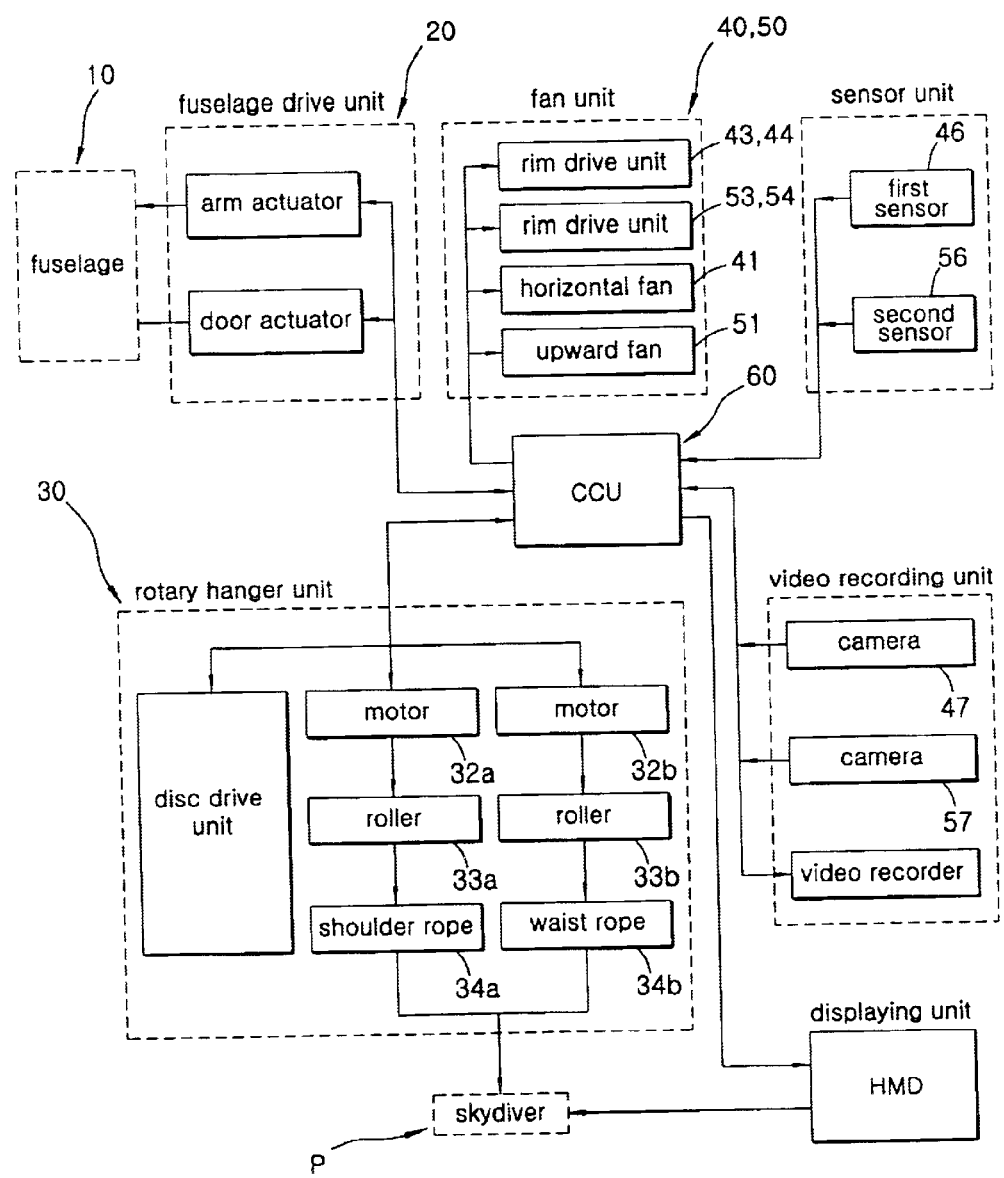
FIG. 10 is a block diagram showing the construction of the simulator of this invention.
Figure 11B:
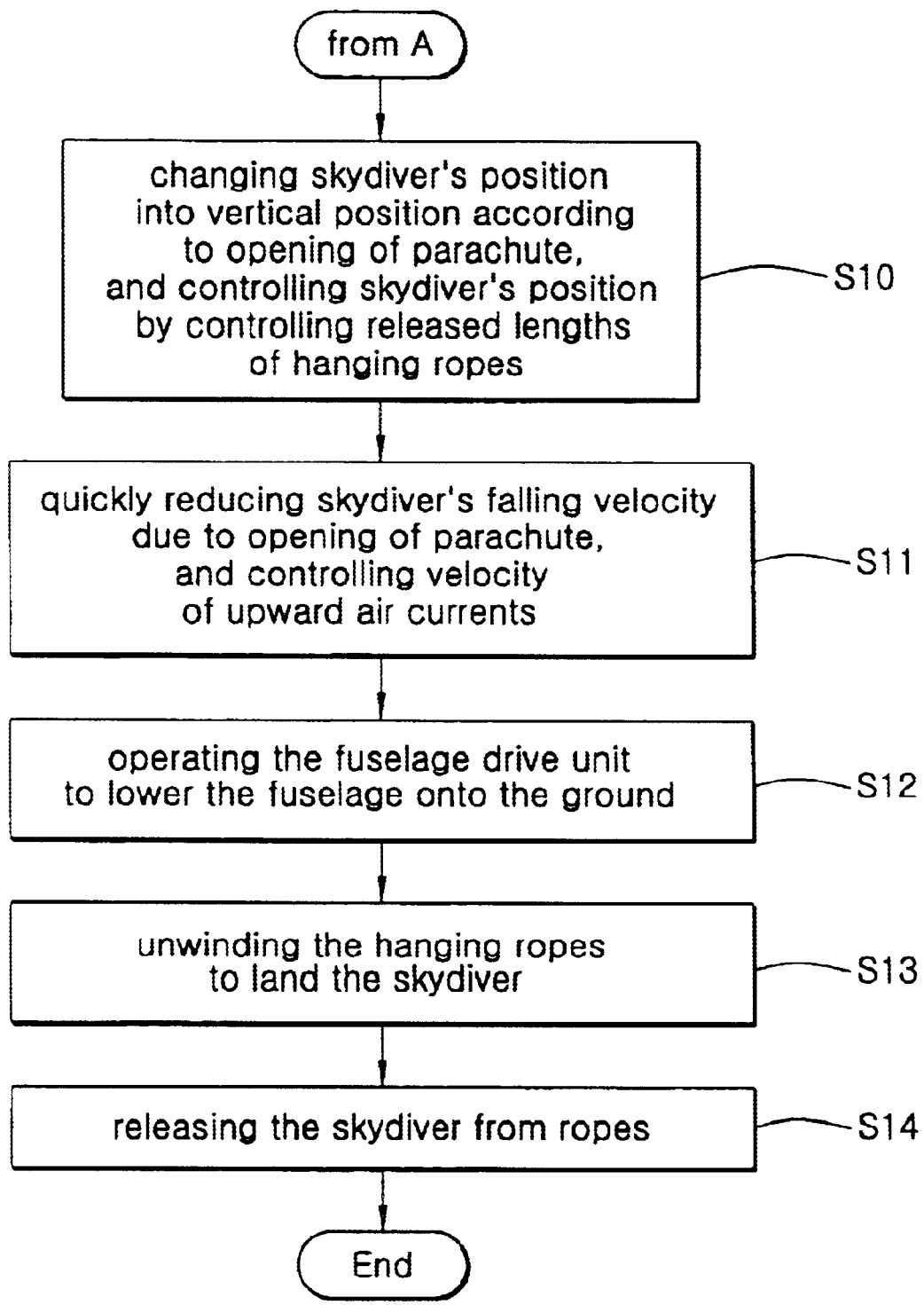

FIG. 10 is a block diagram showing the construction of the simulator of this invention. FIGS. 11A and 11B are flowcharts of the skydiving training process according to this invention.

In a brief description, the skydiving training process using the simulator of this invention comprises the following steps. That is, this simulated skydiving training process is started at a fuselage driving step of operating the fuselage drive unit 20 in response to a control signal outputted from the CCU 60, thus lifting up the fuselage 10, loaded with a skydiver "P" by the lifting arm 21 along an upward arc defined by the end of the lifting arm 21.

Thereafter, a jumping step is performed. At the jumping step, the two fan units 40 and 50, each consisting of a fan and a height-adjustable air guide rim which is controlled in its height by the extendible columns operated in conjunction with the motion of the fuselage 10, respectively force air horizontally and upwardly into the open simulation space around the fuselage 10, and the skydiver "P" jumps from the fuselage 10 into the open simulation space.

The jumping step is followed by a free-falling mode floating step, wherein the rotary hanger unit 30 suspends the skydiver "P" using the hanging ropes after the skydiver jumps from the fuselage 10. The upward fan unit 50 is controlled by the CCU 60 such that the velocity and direction of air currents generated by the fan unit 50 is controlled as time goes by. In addition, the rotary disc 31 is rotated to change the position of the skydiver while allowing the skydiver to horizontally float in a weightless state in the open simulation space.

Thereafter, the CCU 60 performs a skydiver's position changing step of changing the free-falling mode horizontal position of the skydiver to a parachuting mode vertical position by controlling the released lengths of the hanging ropes of the rotary hanger unit 30 in response to a signal representing that the skydiver manipulated a parachute control handle.

The skydiving training process according to this invention is ended at a landing step of lowering the fuselage 10 in response to a signal, which is outputted from the CCU 60 and represents that the skydiver "P" has floated down to be close to the ground. At this landing step, the hanging ropes are slowly unwound from the take-up rollers to safely land the skydiver on the ground.

The skydiving training process of this invention is also characterized in that the CCD cameras 47 and 57, respectively installed on the air guide rims 43 and 53 of the fan units 40 and 50, produce images of the skydiver "P" during the training process from the jumping step to the landing step, and output signals to the CCU 60, thus allowing the images to be recorded on the video recording medium by the video recorder, and the recorded images are reproduced by the video playing unit to analyze the skydiver's position and posture after finishing the skydiving training process.

The above-mentioned steps constituting the skydiving training process using the simulator of this invention will be described in detail herein below.

When a skydiver "P" wearing an HMD and a harness "H" reaches the rear end of the fuselage 10 on the ground, the rear door 11 of the fuselage 10 is opened by the hydraulic cylinder actuators 12, thus allowing the skydiver to climb up along the steps of the rear door 11 and ride in the fuselage 10. When the skydiver enters the fuselage 10, the cylinder actuators is operated to close the real door 11, thus preventing the skydiver from unexpectedly dropping from the fuselage 10 through the open rear door 11.

Thereafter, the fuselage driving step is performed to lift the fuselage 10 upward by the fuselage drive unit 20. That is, the fuselage drive unit 20 is operated in response to a control signal outputted from the CCU 60, thus lifting up the fuselage 10, loaded with the skydiver "P", by the lifting arm 21 along the upward arc defined by the end of said lifting arm 21. In such a case, the fuselage drive unit 20 actuates the lifting arm 21 using a hydraulic actuator or a pneumatic actuator. When the fuselage 10 is lifted up by the lifting arm 21 to reach a predetermined heights the CCU 60 operates the two fan units 40 and 60 to force air horizontally and upwardly to the fuselage 10, thus simulating the environment and other conditions expected from a real take-off of an airplane.

In such a case, since the lifting arm 21 is shafted at its end to the idle bearing 22 of the fuselage 10, the fuselage 10 is lifted up while maintaining in a horizontal position. In addition, a take-off sound is generated in the fuselage 10 as if the fuselage 10 were in a real take-off. When the fuselage 10 is lifted up as described above, the air guide rims 43 and 53 are moved upward by the extendible columns 44 and 54 operated in conjunction with the movement of the fuselage 10 under the control of the CCU 60. Of course, the cameras 47 and 57 and the wind velocity sensors 46 and 56, which are mounted to the rims 43 and 53, are moved upward to follow the lifted fuselage 10. In addition, the two fan units 40 and 50 force air horizontally and upwardly to the fuselage 10.

In such a case, the fan 41 of the horizontal fan unit 40 forces air horizontally to the fuselage 10, thus producing horizontal air currents allowing the skydiver in the fuselage 10 to feel a virtual speed of the fuselage 10 as if the fuselage 10 really flew forward at a high speed in the air.

While the fuselage 10 is lifted up, the HMD, worn on the head of the skydiver, displays a moving image, simulating the environment of a real take-off of an airplane, on its screen, thus improving the realism of the simulation. In addition, the lifting arm 21 shakes during the upward movement of the fuselage 10, thus simulating a shaking of an airplane taking off in the air.

After the fuselage 10 reaches a predetermined height, the skydiver or a trainer connects the hooks of the harness to the rings mounted to the ends of the hanging ropes attached to the fuselage 10 at positions around the jumping door 13, and the skydiver stands on the bottom of the jumping door 13.

When the skydiver stands on the bottom of the jumping door 13, he/she feels the horizontal air currents strongly flowing on the external surface of the fuselage 10, and prepares for jumping.

Thereafter, the jumping step is performed. At the jumping step, the CCU 60 receives wind velocity data and wind direction data determined in accordance with an inputted jumping altitude from the database, and controls the velocities and directions of air currents generated by the two fan units 40 and 50, thus simulating the environment and conditions for purposes of training for the jumping from an airplane. Therefore, the skydiver "P" trains for the jumping in a highly active and realistic fashion as if he/she jumped from a real airplane flying in the air.

When the skydiver "P" jumps from the fuselage 10 into the open simulation space, he/she floats in a weightless state by the air in a free-falling mode horizontal position wherein the skydiver lies on his/her stomach and spreads the limbs in outward directions. In such a case, the skydiver "P" is suspended in the open simulation space by the hanging ropes 34a and 34b supported by the take-up rollers 33a and 33b of the rotary hanger unit 30.

The above hanging ropes 34a and 34b are smoothly supported by the take-up rollers 33a and 33b such that they do not disturb the jumping motion of the skydiver "P". The ropes 34a and 34b are also smoothly lengthened by the weight of the skydiver jumping from the fuselage 10, and so they do not reduce the free-falling velocity of the jumped skydiver. Therefore, the skydiver in the free-falling mode position does not feel any speed reduction. When the skydiver trains for the free-falling mode position, the velocity of air currents generated by the fan 41 of the horizontal fan unit 40 is gradually reduced as time goes by, thus diminishing the horizontal movement of the skydiver in the open simulation space. On the other hand, the velocity of air currents generated by the fan 51 of the upward fan unit 50 is gradually increased such that the resistance of the air in a vertical direction is gradually increased in proportion to an increase in the falling speed of the skydiver "P".

As described above, the CCU 60 appropriately controls the directions and velocities of air currents generated by the fan units 40 and 50 as time goes by after the skydiver "P" jumps from the fuselage 10 and in accordance with images of the skydiver's position produced by the CCD cameras 47 and 57. In such a case, the image displayed on the HMD varies under the control of a virtual image processor to simulate the environment of a free-falling stage in a real skydiving.

That is, after the skydiver "P" jumps from the fuselage 10 into the open simulation space, the CCU 60 controls the directions and velocities of air currents generated by the two fan units 40 and 50 as time goes by and in accordance with images of the skydiver's position and posture produced by the cameras, and changes the image displayed on the HMD of the skydiver, thus allowing the skydiver to float in a weightless state in the open simulation space having the simulated environment and other conditions for the purposes of training for free-falling after jumping.

In addition, the rotary disc 31 suspending the skydiver "P" is rotated by the motor "M" under control of the CCU 60. The skydiver "P" thus moves in a weightless state in the simulation space while changing his/her position and posture and being supported by the air currents, which are generated by the two fan units 40 and 50 and changed in their directions and velocities in accordance with simulated variable altitudes under the control of the CCU 60.

That is, when the skydiver "P" jumps from the fuselage 10 into the open simulation spaces the upward fan unit 50 installed under the simulation space forces upward air currents, thus supporting the skydiver in a weightless state and allowing the skydiver to float in a horizontal position in the air. In such a case, the CCU 60 changes the velocities of the horizontal and upward air currents and the positions of the air guide rims 43 and 53 of the two fan units 40 and 50 in accordance with the position of the skydiver. The CCU 60 also controls the rotation of the rotary disc 31 such that the disc 31 does not twist or tighten the hanging ropes 34a and 34b or reduce the realism of the simulated skydiving process. In addition, the CCU 60 controllably drives the take-up rollers 33a and 33b in accordance with the position of the skydiver, thus adjusting the lengths of released parts of the hanging ropes and controlling the position of the skydiver.

In such a case, an image signal representing the simulated environment of the skydiver is transmitted to the HMD of the skydiver, thus allowing the HMD to display the image of the environment on its screen to improve the realism of the simulated skydiving. The heights of the air guide rims 43 and 53 of the fan units 40 and 50 are changed by the extendible columns 44 and 54 in accordance with a variation in the floating altitude of the skydiver, and so it is possible to support the skydiver in a weightless state in the simulation space using a minimum quantity of air currents and allow the skydiver to feel horizontal air currents as if he/she moved horizontally in the air in a real skydive.

When the floating skydiver "P" manipulates the parachute control handle after a period of time has elapsed from the jumping, a parachute opening signal is transmitted from the control handle to the CCU 60. Upon receiving the parachute opening signal, the CCU 60 operates the drive motors 32a and 32b to wind the ropes 34a and 34b on the rollers 33a and 33b such that the position of the skydiver is changed from the horizontal position of the free-falling mode to a vertical position of a parachuting mode.

In a detailed description, when it is desired to change the free-falling mode horizontal position of the skydiver "P" to a vertical position of the parachuting mode, the two types of hanging ropes 34a and 34b are appropriately wound around the take-up rollers 32a and 32b such that the released part of the shoulder hanging rope 34a is shorter than that of the waist hanging rope 34b by a predetermined length. The skydiver's horizontal floating position of the free-falling mode is thus changed to a desired vertical position of the parachuting mode.

In other words, when a predetermined period of time has elapsed after the skydiver initially floats in a weightless state in the free-falling mode, the skydiver reaches a predetermined height from the ground. In such a case, the skydiver manipulates the parachute control handle, and a parachute opening signal is transmitted from the control handle to the CCU 60. Upon reception of the parachute opening signal, the CCU 60 adjusts the lengths of the hanging ropes 34a and 34b, connected to the harness of the horizontally floating skydiver, by operating the take-up rollers 33a and 33b, thus changing the position of the skydiver from the horizontal position of the free-falling mode to a vertical position of the parachuting mode. In such a case, the two types of hanging ropes 34a and 34b are independently wound around the take-up rollers 32a and 32b such that the released part of the shoulder hanging rope 34a is shorter than that of the waist hanging rope 34b by a predetermined length. The upper body of the skydiver in the horizontal floating position is thus pulled upward by the shoulder hanging rope, while the lower body of the skydiver is lowered down by the waist hanging rope. The skydiver's horizontal floating position of the free-falling mode is thus changed to a desired vertical position of the parachuting mode.

Such a mechanism of this simulator for changing of the skydiver's position from the horizontal position of the free-falling mode to the vertical position of the parachuting mode is remarkably different from conventional skydiving simulators with a position changing mechanism using air currents. The position changing mechanism of this simulator simulates the environment and other conditions allowing the skydiver to train for position changing in a highly realistic fashion. That is, the simulated environment and conditions performed by this position changing mechanism are similar to those of real skydiving wherein the just-opened real parachute encounters considerable air resistance, such that the harness is jerked upward, thereby changing the position of a skydiver. This mechanism thus significantly improves the skydiving training effect, and allows the skydivers to easily become skilled in the quick pulling motion of the strips of real parachutes when opening the parachutes in the air.

Of the CCD cameras 47 and 57 attached to the predetermined positions of the air guide rims 43 and 53, the upward positioned second camera 57 produces, at the bottom of the open simulation space, images of the position and posture of the skydiver jumping from the fuselage 10 and floating in the simulation space. The horizontally positioned first camera 47 produces, at a side of the simulation space, images of the position and posture of the skydiver while moving to be horizontally aligned with the skydiver. The two cameras 47 and 57 produce images of the skydiver from the step of jumping from the fuselage 10 to the step of landing on the ground, and output image signals to the CCU 60, thus allowing trainers or inspectors to view the images displayed on a screen in the control room "S".

The images produced by the cameras 47 and 57 are analyzed by the CCU 60 to measure the position and posture of the skydiver and determine vertical and horizontal cross-sectional areas of the space required by the skydiver while skydiving. The images are also recorded on a video recording medium by the video recorder, and so the skydiver is allowed to reproduce the images to check his/her position and posture after training for the simulated skydiving. This significantly improves the skydiving training effect.

Different from conventional simulated skydiving training processes using sensors attached to the bodies of skydivers, the simulated training process of this invention using the cameras provides high realism and effectively analyzes a detailed change in the position or posture of a skydiver, thus providing a highly improved skydiving training effect. It is also possible for this training process to allow a precise adjustment of a skydiver's position or posture and a reliable analysis of results of a detailed change in the skydiver's position or posture.

FIGS. 11A and 11B are flowcharts of the simulated skydiving training process according to this invention. The skydiving training process of this invention will be described in more detail herein below with reference to the flowcharts.

As shown in the drawings, at step S1, an operator of the simulator seated in the control room "S" inputs and stores data of a desired jumping altitude, and variable falling velocity, falling altitude, wind direction, wind velocity in a simulated skydiving to the CCU 60 using a data input unit.

Thereafter, the rear door 11 of the fuselage 10 is opened at step S2 by the door actuators 12 to allow a skydiver to enter the fuselage 10, and is closed after the skydiver enters.

At step S3, the fuselage 10 is lifted up by the fuselage drive unit 20, and at the same time, the horizontal fan unit 40 generates horizontal air currents, which flow to the front of the fuselage 10.

At step S4, the CCU 60 compares the actual velocity of the horizontal air currents, sensed at a time when the fuselage 10 completely reaches a desired height from the ground, with the reference wind velocity at the jumping altitude stored in the CCU 60, and controls the actual velocity of the horizontal air currents such that the actual velocity of the air currents generated by the fan unit 40 becomes equal to the reference wind velocity at the jumping altitude.

At step S5, the skydiver "P" jumps from the jumping door 13 of the fuselage 10 after the actual velocity of the air currents becomes equal to the reference wind velocity at the jumping altitude.

At step S6, the upward fan unit 50 starts generation of upward air currents under the control of the CCU 60 at the same time as jumping of the skydiver. The CCU 60 controls the velocities of horizontal and upward air currents such that the velocity of the horizontal air currents is gradually reduced, while the velocity of the upward air currents is gradually increased, thus making the skydiver have a horizontal position of free-falling mode in the air.

At step S7, the CCU 60 checks the skydiver's free-falling velocity, the variable altitude of the free-falling skydiver, and the skydiver's position as time goes by. At step S8, the CCU 60 determines the positions of the fan units 40 and 50 agreeing with the skydiver's falling altitude, and adjusts the positions of the fan units 40 and 50 by operating the extendible columns 44 and 54, thus adjusting the positions of the fan units 40 and 50 to control the velocities of the horizontal and upward air currents.

At step S9, the CCU 60 receives a signal from the parachute control handle when the skydiver manipulates the control handle to open his/her virtual parachute after free-falling to reach a predetermined altitude at which the skydiver must open his/her parachute, and determines whether the virtual parachute is opened or not. If the answer at step S9 is yes, this means that a signal has been inputted from the parachute control handle to the CCU 60 and the virtual parachute has been opened. In such a case, the CCU 60 drives the take-up rollers of the rotary hanger unit 30 to independently wind the hanging ropes, thus changing the position of the skydiver from the horizontal position to a vertical position. However, if the answer at step S9 is no, the procedure is returned to step S6.

That is, if the answer at step S9 is yes, the skydiver's position is changed from the horizontal position to a vertical position by an independent adjustment of the hanging ropes at step S10. Thereafter, at step S11, the velocities of air currents generated from the fan units 40 and 50 are controlled by the CCU 60 such that the skydiver's falling velocity is quickly reduced due to the opening of the parachute.

At step S12, the fuselage drive unit 20 is operated in response to a control signal outputted from the CCU 60 when the skydiver has approached to a predetermined altitude close to the ground as time goes by. The fuselage 10 is thus lowered down to a position in the air where the skydiver can land on the ground. At step S13, the hanging ropes are sufficiently unwound from the take-up rollers of the rotary hanger unit 30, thus allowing the skydiver to land on the ground as if he/she really landed on the ground in real skydiving. At step S14, the skydiver is released from the hanging ropes, thus ending the simulated skydiving training process of this invention.

INDUSTRIAL APPLICABILITY

As described above, the present invention provides a skydiving simulator and a skydiving training process using the simulator. The skydiving simulator and training process of this invention simulates the environment and other conditions for purposes of skydiving training as if a skydiver performed a real skydiving process from the first step of riding in an airplane to the last step of landing on the ground, thus allowing the skydiver to train for skydiving in a highly active and realistic fashion and improving the skydiving training effect.

The skydiving simulator and training process of this invention also simulates the environment and other conditions for purposes of skydiving training as if the skydiver performed a real skydiving process, thus allowing beginners or unskilled skydivers to become proficient in skydiving as a result of repeated training processes safely performed on the ground, and saving them from being struck with fear when jumping from a real airplane at a high altitude while really skydiving, and protecting them from unexpected safety hazards during such real skydiving.

In addition, the skydiving simulator and training process of this invention checks and controls the position and posture of a skydiver in real time, and records a variation in the position and posture of the skydiver on a video recording medium by a video recorder, and reproduces the recorded data to analyze the skydiver's position and posture after finishing a skydiving training process.

Furthermore, the skydiving simulator and training process of this invention reduces the installation and maintenance cost of such simulators, and reduces a leakage of air currents from the simulator to reduce energy loss to the minimum during a skydiving training process, and thus has improved economic efficiency.

In a brief description, the skydiving simulator and training process of this invention allows a skydiver to train for skydiving in a highly active and realistic fashion by simulating the environment and other conditions for purposes of skydiving training as if the skydiver performed a real skydiving process from the first step of riding in an airplane to the last step of landing on the ground, and controls the position and posture of the skydiver in real time, and records images of the skydiver's position and posture to reproduce the recorded data in an effort to analyze the skydiver's position and posture after finishing a skydiving training process, and reduces the installation and maintenance cost of such simulators in an effort to improve economic efficiency of the skydiving simulators and training processes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A skydiving simulator, comprising:
   a model fuselage for loading a skydiver therein;
   a fuselage drive unit for actuating said fuselage;
   a rotary hanger unit mounted to a top wall of said fuselage to be aligned with a central axis of a jumping door of the fuselage, and used for supporting the skydiver having jumped from said fuselage;
   a plurality of fan units for horizontally forcing air currents into the front of said fuselage in conjunction with a movement of the fuselage actuated by the fuselage drive unit, and upwardly forcing air currents into an open simulation space when the skydiver jumps from the fuselage into the open simulation space;
   a plurality of wind velocity sensors for sensing velocities of the air currents generate by said fan units;
   a plurality of charge coupled device cameras (CCD cameras) for producing images of the skydiver during a skydiving training process from a step of jumping from the fuselage to a step of landing on the ground; and
   a central control unit (CCU) installed in a control room and used for controlling both an operation of said elements and the skydiving training process of the skydiver in real time.

2. The skydiving simulator according to claim 1, wherein said fuselage drive unit comprises:
   an idle bearing provided at a predetermined position of sidewall of said fuselage; and
   a lifting arm having a predetermined length and coupled at a first end thereof to said idle bearing, and at a second end thereof to a rotating shaft of an arm actuator installed on the ground for actuating said lifting arm.

3. The skydiving simulator according to claim 1, wherein said rotary hanger unit comprises:
   a rotary disc coupled to an outside end of a hanger support projecting to a predetermined position above and in front of said jumping door of the fuselage; and
   a disc drive motor used for rotating said rotary disc clockwise or counterclockwise.

4. The skydiving simulator according to claim 3, wherein said rotary disc includes:
   a plurality of take-up rollers installed in said rotary disc and each wound with a hanging rope used for supporting the skydiver;
   a plurality of roller drive motors used for rotating said take-up rollers to wind or unwind the ropes under the control of said CCU; and
   a plurality of signal transmitting wires used for transmitting signals from the CCU to said roller drive motors.

5. The skydiving simulator according to claim 1, wherein said fan units consist of:
   a horizontal fan fixedly supported on the ground at a position in front of said fuselage and used for generating horizontally forced air currents;
   an upward fan fixedly supported on the ground at a position under the fuselage and used for generating upwardly forced air currents when the skydiver jumps from the fuselage;
   a plurality of vertically extendible columns provided at positions around each of the horizontal and upward fans, and operated in conjunction with a movement of the fuselage;
   an air guide tunnel connected at first and second ends thereof to an edge of each of the horizontal and upward fans and top ends of associated extendible columns, and used for guiding air currents generated by an associated fan; and an air guide rim controlling the height of the second end of the air guide tunnel from the ground in conjunction with a motion of the extendible columns.

6. The skydiver simulator according to claim 5, wherein said air guide tunnel has a bellows structure fabricated using an elastic and flexible material.

7. A skydiving training process using a skydiving simulator, comprising:
  a fuselage driving step of operating a fuselage drive unit in response to a control signal outputted from a central control unit (CCU), thus lifting up said fuselage, loaded with a skydiver, by a lifting arm along an upward arc defined by an outside end of said lifting arm;
  a jumping step of operating horizontal and upward fan units, each consisting of a fan and a height-adjustable air guide rim controlled in a height thereof by an extendible column operated in conjunction with a motion of said fuselage and respectively forcing air currents horizontally and upwardly into an open simulation space around the fuselage, and letting the skydiver jump from the fuselage into the open simulation space;
  a free-falling mode floating step of suspending the skydiver using a plurality of hanging ropes of a rotary hanger unit after the skydiver jumps from the fuselage, and controlling the upward fan unit by the CCU such that velocity and direction of the air currents generated by said upward fan unit is controlled as time goes by, and rotating a rotary disc to change a position of the skydiver while allowing the skydiver to horizontally float in a weightless state in the open simulation space;
  a skydiver's position changing step of changing a free-falling mode horizontal position Of the skydiver to a parachuting mode vertical position by controlling lengths of released parts of said hanging ropes of the rotary hanger unit in response to a signal representing that the skydiver manipulates a parachute control handle; and
  a landing step of lowering the fuselage in response to a signal, outputted from said CCU and representing that the skydiver has floated down to be close to the ground, and unwinding the hanging ropes from a plurality of take-up rollers to safely land the skydiver on the ground.

8. The skydiving training process according to claim 7, wherein said CCU at the jumping step receives wind velocity data and wind direction data determined in accordance with an inputted jumping altitude from a database, and controls velocities and directions of air currents generated by the horizontal and upward fan units, thus simulating the environment and conditions for purposes of training for jumping from an airplane.

9. The skydiving training process according to claim 7, wherein said CCU controls the directions and velocities of air currents generated by the horizontal and upward fan units as time goes by after the skydiver jumps from the fuselage and in accordance with images of positions of the skydiver produced by a plurality of cameras, and controls an head-mounted display (HMD) worn on the skydiver's head such that an image displayed on the HMD varies to simulate the environment of a free-falling stage in a real skydiving, thus allowing the skydiver to float in a weightless state in the open simulation space having the simulated environment and other conditions for the purposes of training for free-falling after jumping.

10. The skydiving training process according to claim 7, wherein said CCU controls the horizontal and upward fan units such that the velocities and directions of air currents generated by said fan units are controlled to agree with a skydiver's free-falling altitude, and also operates a disc drive motor to rotate the rotary disc suspending the skydiver, thus changing the position of the skydiver while allowing the skydiver to horizontally float in a weightless state in the open simulation space.

11. The skydiving training process according to claim 7, wherein said CCU receives a parachute opening signal outputted from a parachute control handle when the skydiver manipulates the parachute control handle after a period of time has elapsed from the jumping, and operates a plurality of roller drive motors to wind the ropes on said take-up rollers such that the position of the skydiver is changed from the horizontal position of the free-falling mode to the vertical position of the parachuting mode.

12. The skydiving training process according to claim 7, wherein a plurality of CCD cameras, installed on the air guide rims of the fan units at predetermined positions to be directed toward the skydiver, produce images of the skydiver front the jumping step to the landing step, and output image signals to the CCU, thus allowing the images of the skydiver to be recorded an a video recording medium by a video recording unit, and reproduced by a video playing unit to analyze the skydiver's position and posture after finishing the skydiving training process.

13. The skydiving simulator according to claim 3, wherein said rotary disc is coupled to the hanger support by a rotating shaft assembly, said rotating shaft assembly consisting of a rotary contact shaft provided at a lower portion thereof and a fixed contact shaft provided at an upper portion thereof to come into contact with the rotary contact shaft, with a first signal transmitting wire jointed to the rotary contact shaft so as to accomplish a signal transmission from the rotary contact shaft to the roller drive motors, and a second signal transmitting wire jointed to the fixed contact shaft so as to accomplish a signal transmission from the CCU to the roller drive motors through the fixed and rotary contact shafts, whereby said signal transmitting wire jointed to the rotary contact shaft is rotated along with the rotary disc, and so the signal transmitting wires are prevented from twisting.

14. The skydiving simulator according to claim 4, wherein said rotary disc is coupled to the hanger support by a rotating shaft assembly, said rotating shaft assembly consisting of a rotary contact shaft provided at a lower portion thereof and a fixed contact shaft provided at an upper portion thereof to come into contact with the rotary contact shaft, with a first signal transmitting wire jointed to the rotary contact shaft so as to accomplish a signal transmission from the rotary contact shall to the roller drive motors, and a second signal transmitting wire jointed to the fixed contact shaft so as to accomplish a signal transmission from the CCU to the roller drive motors through the fixed and rotary contact shafts, whereby said signal transmitting wire jointed to the rotary contact shall is rotated along with the rotary disc, and so the signal transmitting wires are prevented from twisting.

* * * * *